United States Patent [19]

Bertoglio

[11] 4,445,001
[45] Apr. 24, 1984

[54] CIRCUIT ARRANGEMENT FOR IDENTIFYING TELEPHONE SUBSCRIBERS

[75] Inventor: Ottavio Bertoglio, Turin, Italy

[73] Assignee: CELT Centro Studi e Laboratori Telecomunicazioni S.p.A., Turin, Italy

[21] Appl. No.: 354,069

[22] Filed: Mar. 2, 1982

[30] Foreign Application Priority Data

Mar. 3, 1981 [IT] Italy ................. 67289 A/81

[51] Int. Cl.³ .................... H04M 1/57; H04Q 3/74
[52] U.S. Cl. .................. 179/17 A; 179/18 FH
[58] Field of Search ............... 179/18 FH, 17 A, 5.5, 179/27 DB

[56] References Cited

U.S. PATENT DOCUMENTS

| | | | |
|---|---|---|---|
| 3,787,626 | 1/1974 | Subieta | 179/5.5 |
| 3,859,472 | 1/1975 | Matthews | 179/18 FH |
| 3,864,522 | 2/1975 | DeKozan et al. | 179/5.5 |
| 3,997,732 | 12/1976 | Every, Sr. et al. | 179/18 FH |
| 4,241,238 | 12/1980 | Strand | 179/5.5 |
| 4,289,931 | 9/1981 | Baker | 179/5.5 |

FOREIGN PATENT DOCUMENTS

| | | | |
|---|---|---|---|
| 2260023 | 9/1973 | Fed. Rep. of Germany | 179/5.5 |
| 2705137 | 8/1978 | Fed. Rep. of Germany | 179/18 FH |
| 2800738 | 7/1979 | Fed. Rep. of Germany | 179/5.5 |
| 3029661 | 3/1982 | Fed. Rep. of Germany | 179/18 FH |
| 54-140806 | 11/1979 | Japan | 179/5.5 |
| 1170331 | 11/1969 | United Kingdom | 179/18 FH |
| 2014825 | 2/1979 | United Kingdom | 179/5.5 |

*Primary Examiner*—Thomas W. Brown
*Attorney, Agent, or Firm*—Karl F. Ross; Herbert Dubno

[57] ABSTRACT

A request generator, when operated by a telephone subscriber or by a processor at an exchange, briefly interrupts an established talking connection to send a trigger signal toward a participating station for activating an identity transmitter associated therewith to send back a characteristic code individually assigned to that station. The code, which may consist of up to 16 bytes, is fed to an identity receiver at the inquiring station or at the exchange for visual display and/or recordal. A subscriber's request generator is preferably disposed downstream of the corresponding identity transmitter, as seen from the subscriber station, and responds to an activating signal emitted by that subscriber with a frequency outside the voice band for sending out the trigger signal, thereby preventing a response to this identity transmitter. In the event of two subscribers sharing a common party line, a read-only memory in the identity transmitter of that line stores only one code but a logic network in its readout circuit modifies a predetermined bit of one byte, and if necessary a corresponding parity bit in a check word of the code, if the line is seized by a particular one of the two subscribers. When the establishment of a talking connection is controlled by a processor at the exchange, a centralized identity transmitter may have a read/write memory loaded by the processor with the characteristic code of a participating subscriber station and send it out in response to a trigger signal from a request generator at the exchange or at the other participating station.

21 Claims, 20 Drawing Figures

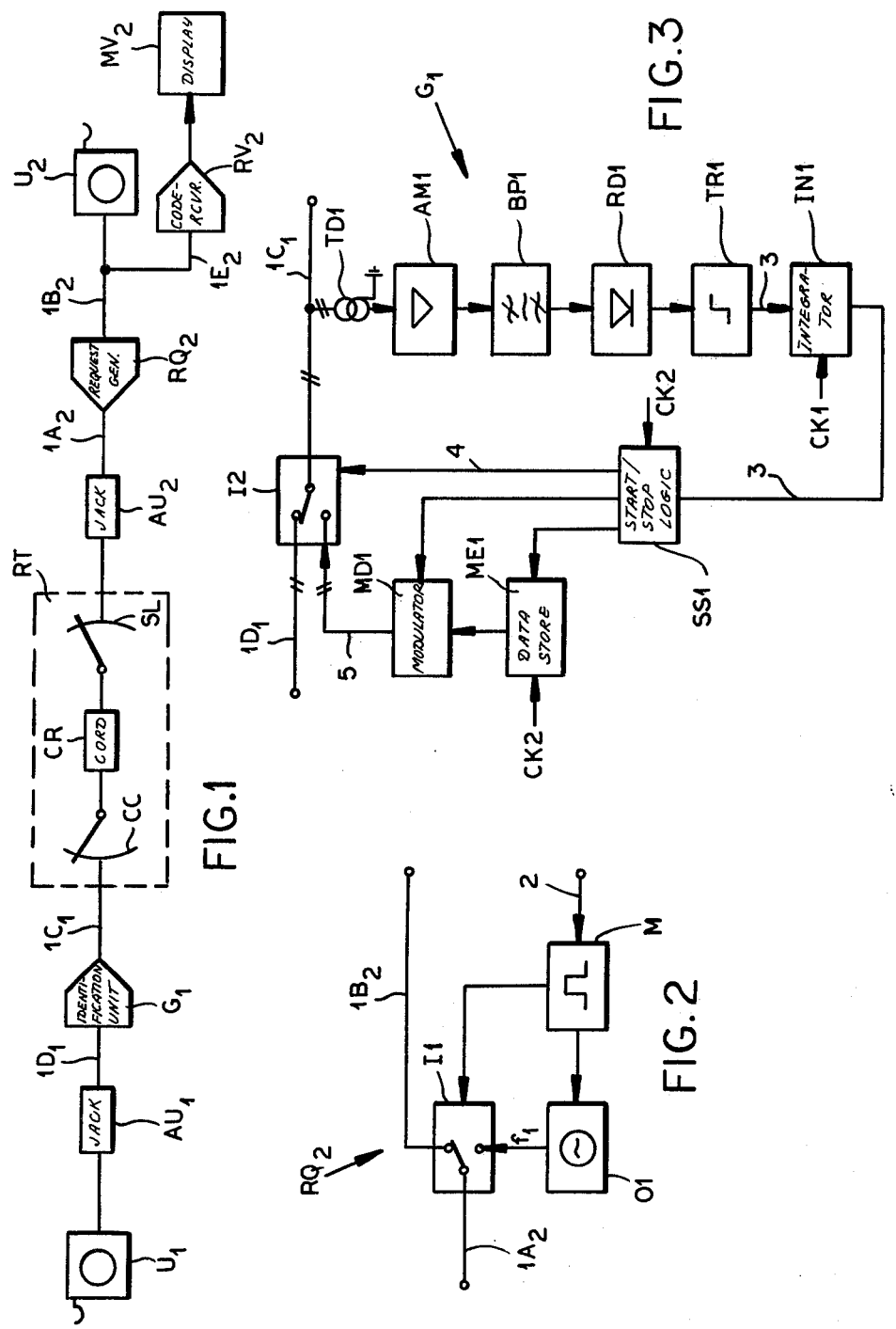

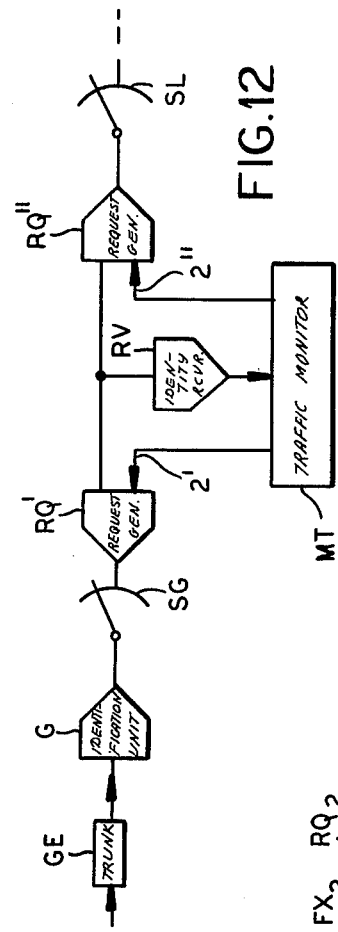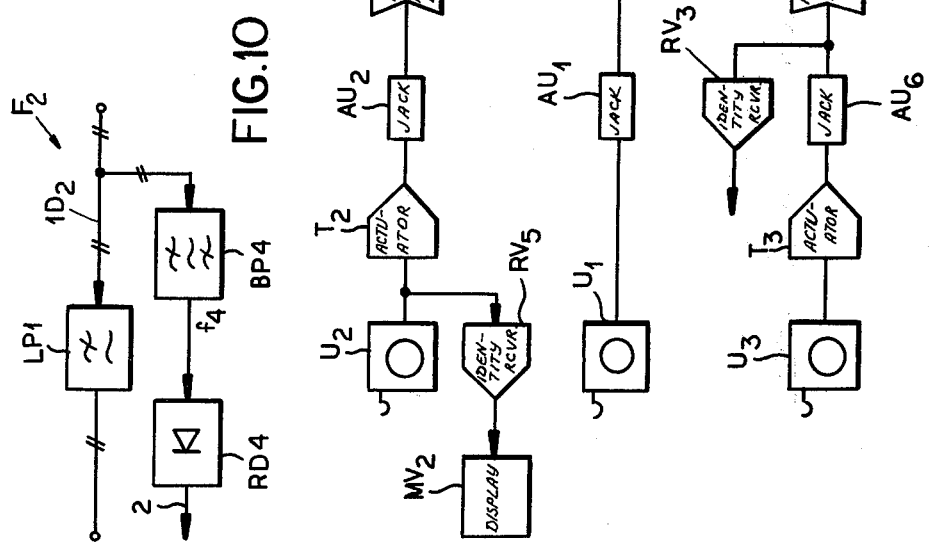
FIG.12
FIG.13
FIG.10

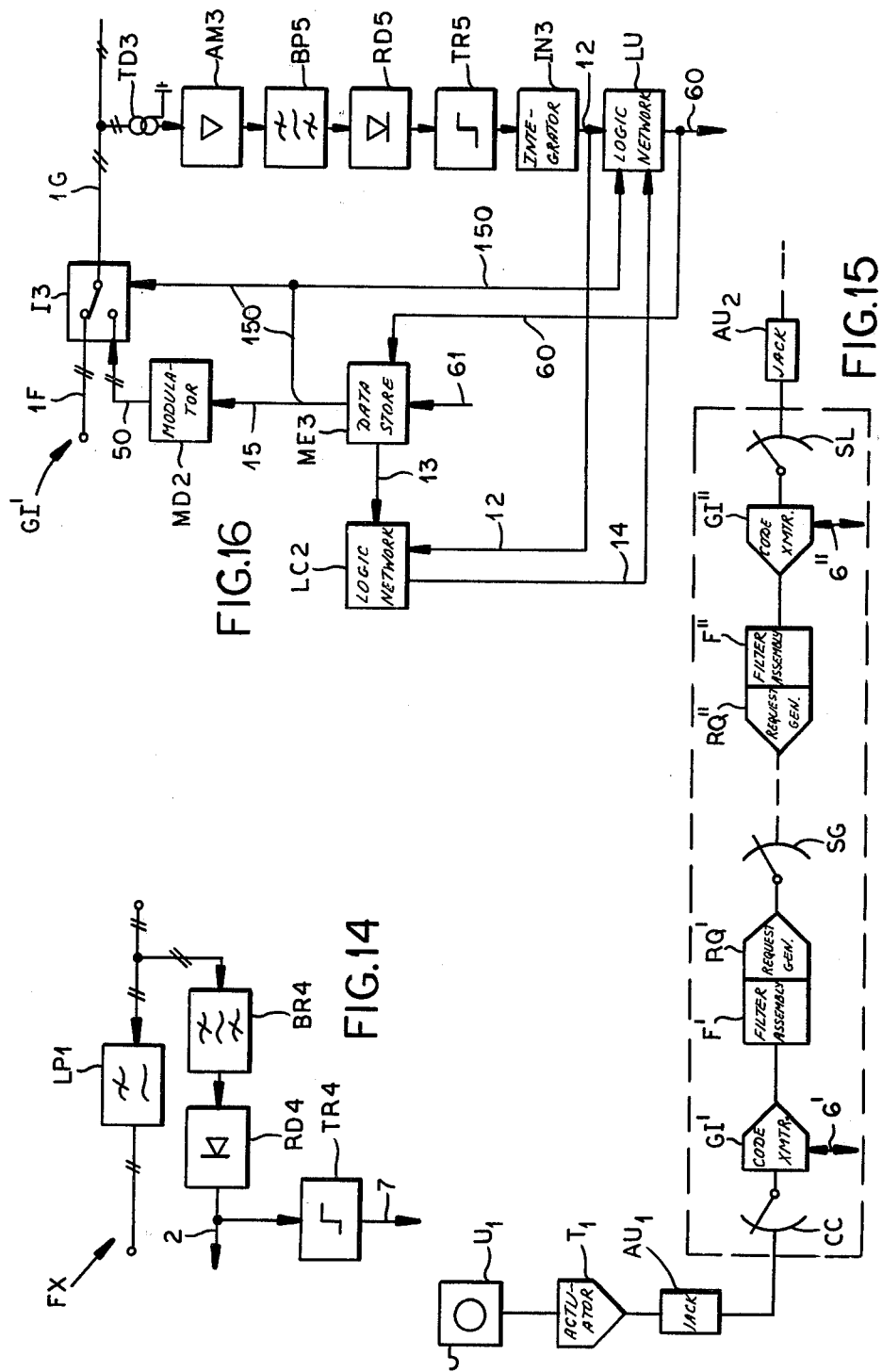

CIRCUIT ARRANGEMENT FOR IDENTIFYING TELEPHONE SUBSCRIBERS

FIELD OF THE INVENTION

My present invention relates to a circuit arrangement for identifying individual subscribers in a telephone system.

BACKGROUND OF THE INVENTION

Whereas intercommunicating subscribers of a telegraph or teleprinter system generally know each other's identity upon the establishment of a signal path therebetween, such is not the case in the usual telephone system where, with more conventional exchanges, the identity of a caller is not known beyond the subscriber's cord. Even with an automatic exchange operating under the control of a processor, e.g. with pulse-code modulation, the processor does not preserve the call numbers of the participating subscriber stations beyond the termination of a talking connection; while the identity of a station making a long-distance call may be recorded for billing purposes, extracting that information from the metering devices is a cumbersome task. There are, however, a number of instances when an instantaneous identification of a subscriber station participating in a talking connection would be useful to an operator at the exchange or to a participating subscriber. Thus, for example, the operator may recognize a particular caller as entitled to or barred from certain services. A calling party could ascertain whether or not the correct station has been reached when, say, the called subscriber does not respond. Conversely, a subscriber receiving a malicious call would be able to trace its origin immediately. The metering and documentation of trunk calls could also be simplification with the aid of equipment adapted to identify calling and called stations at any time in the course of a conversation. Such equipment would further facilitate the monitoring of traffic over a particular line, including the recording of abortive calls.

OBJECT OF THE INVENTION

Thus, the object of my present invention is to provide simple means for enabling an instantaneous identification, in response to a manual or automatic inquiry, of a subscriber station engaged in a calling connection.

SUMMARY OF THE INVENTION

My invention is applicable to any telephone system in which a multiplicity of subscriber stations are linked via signal paths including respective local lines to a common exchange having switching circuitry for establishing talking connections between calling and called stations. In accordance with this invention, I provide identity-transmitting means including a memory for storing a characteristic code which is assigned to a local line associated with a subscriber station participating in such a talking connection, the identity-transmitting means being responsive to a trigger signal from request-generating means switchable into the talking connection for sending out the characteristic code stored in its memory, with the trigger signal and the code both traveling over the established connection. This code is registered, in the form of a visual indication and/or as a permanent record, by identity-receiving means having access to the established talking connection, e.g. at a request-originating subscriber station or at the exchange.

Especially in the case of an exchange not equipped with a suitably preprogrammed processor, the identity-transmitting means should comprise a multiplicity of identification units each coupled to a respective subscriber station through the associated local line, such units being preferably provided at any point from which a call reaching the exchange can originate. This includes also pay stations not designed to receive incoming calls, line-testing equipment, trunks, junctors giving access to the international network, private branch exchanges directly connected to group selectors (and possibly their individual extensions), and operators' posts. The memory of such an identification unit will be of the read-only type permanently storing the respective code. With a processor-assisted exchange, on the other hand, the identity-transmitting means may comprise a centralized code transmitter with a read/write memory which is loadable in response to an incoming trigger signal with data bits from the processor identifying a participating (calling or called) station.

In the first instance, the request-generating means may comprise a multiplicity of individual request generators operable by subscriber-controlled means at respective called stations for temporary insertion into established talking connections in order to forward their trigger signals to the identification units of the calling stations communicating with them. Alternatively, or in addition, such a request generator may be centralized at the exchange for actuation by an operator or by a processor-generated control pulse.

In order to prevent tampering by a subscriber, an identification unit associated with a subscriber station should be connected to the corresponding local line at a location remote from the station itself. Thus, a trigger signal generated by a pushbutton or other subscriber-controlled means could operate that station's own identification unit along with the corresponding unit of the remote subscriber station whose identity is to be ascertained. In order to avoid such undesirable operations, the signal emitted by the subscriber-controlled means at, say, the called station advantageously is not the trigger signal itself but an activating signal of a frequency lying outside a voice band normally transmitted over the local line, the request generator itself being insertable in response to this activating signal into the established talking connection at a point downstream of the associated identification unit as seen from the called station. Such a request generator should also include switchover means for temporarily disconnecting the associated identification unit from the existing talking connection during emission of the trigger signal in response to that activating signal. This latter signal may be blocked by a first filter, inserted between the called station and the associated identification unit, while clearing a second filter in a path bypassing the first filter and the identification unit of the called station.

The characteristic code identifying any participating station will generally consist of several multibit words, preferably bytes, which may include a check word enabling a parity test to determine the correctness of such a code arriving at a receiving unit by way of the talking connection or at a centralized code generator from the processor of the exchange. An indication of correctness can also be obtained from predetermined start and stop bits of each code word. In the event of an irregularity, an error output of a code-verifying logic network emits an alarm signal; if that logic network is part of a centralized code transmitter, such an alarm signal may initiate a reloading of the read/write memory of that code transmitter with identification data bits furnished by the processor. The number of such reloadings may be limited by a counter forming part of the logic network.

A further feature of my invention resides in the provision of discriminating means modifying a bit of a stored code, assigned to a local line shared by two subscriber stations, for identifying one or the other station as the active one.

BRIEF DESCRIPTION OF THE DRAWING

The above and other features of my invention will now be described in detail with reference to the accompanying drawing in which:

FIG. 1 is an overall block diagram of part of a telephone system embodying my invention, with two subscriber stations capable of intercommunicating via an exchange;

FIG. 2 is a block diagram of a request generator included in the system of FIG. 1;

FIG. 3 is a block diagram of an identification unit also included in that system;

FIG. 8 is a set of graphs relating to the operation of the components of FIG. 7;

FIG. 10 is a block diagram of a filter assembly forming part of the system of FIG. 9;

FIG. 12 is a block diagram illustrating part of a modified telephone system embodying my invention;

FIG. 13 is a block diagram similar to that of FIG. 11, illustrating a system with a processor-assisted exchange;

FIG. 14 is a block diagram similar to that of FIG. 10, showing a modified filter assembly included in the system of FIG. 13;

FIG. 15 is a block diagram showing part of a system similar to that of FIG. 13 but with a modified exchange;

FIG. 16 is a block diagram of a centralized code transmitter forming part of the system of FIG. 13 or 15;

SPECIFIC DESCRIPTION

Figure 4:
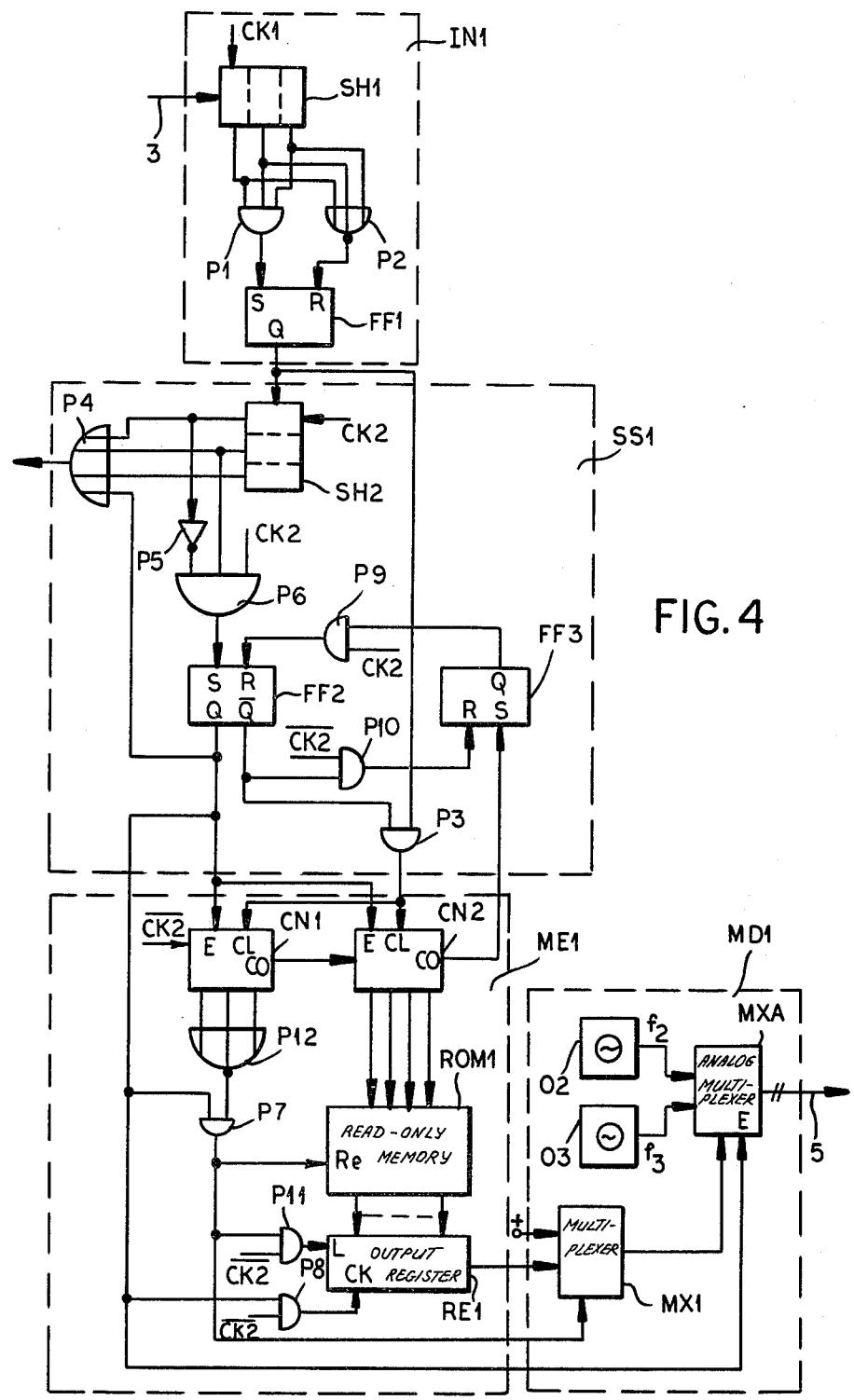
FIG. 4 is a more detailed circuit diagram of certain components of the identification unit of FIG. 3.

FIG. 1 shows two subscriber stations $U_1$ and $U_2$ connected via respective two-wire local lines, including jacks $AU_1$ and $AU_2$, to an exchange represented by switching circuitry RT of which only a line finder CC and a final or line selector SL have been illustrated along with an intervening cord CR. The subscriber line associated with station $U_1$ has sections $1C_1$, $1D_1$ downstream of jack $AU_1$ between which an identification unit $G_1$ is inserted. A request generator $RQ_2$ lies between sections $1A_2$ and $1B_2$ of the subscriber line associated with station $U_2$, upstream of jack $AU_2$, for operation by a command from that station. Line section $1B_2$ upstream of request generator $RQ_2$ has a branch $1E_2$ terminating at a code receiver $RV_2$ connected to a device for registering the identity of the remote station $U_1$, specifically a display-type visual indicator $MV_2$.

In this Figure, for simplicity's sake, only station $U_1$ is provided with an identification unit although in practice, as noted above and described hereinafter with reference to FIG. 9, each station should be so equipped. Request generator $RQ_2$ and code receiver $RV_2$ could also be duplicated in the line associated with station $U_1$, though this may not be needed in some instances (e.g. when station $U_1$ is a pay telephone).

When station $U_2$ receives a call from station $U_1$, the receiving subscriber may press a pushbutton to activate the request generator $RQ_2$ into sending out a trigger signal reaching the identification unit $G_1$ associated with station $U_1$. This unit thereupon sends back its stored characteristic code via line section $1C_1$, switching stages of exchange RT, line sections $1A_2$ and $1B_2$ and branch $1E_2$ to receiver $RV_2$ for display on indicator $MW_2$ and possible entry on a recording medium.

It will be assumed, by way of example, that the characteristic code identifying a calling subscriber station is a 16-digit number, each digit being represented by an 8-bit code word or byte. The first bit of each byte is an invariable start bit, of logical value "1", while the last two bits are invariable stop bits of logical value "0". The five intervening bits, termed information bits hereinafter, may represent decimal digits with telegraphic or BCD coding; in the latter instance there will be some redundancy left over for checking purposes. With a transmission rate of, say, 300 bauds, the 128 bits of such a code can be sent out in approximately 400 ms which does not entail a significant interruption of conversation between the two parties.

Even on international calls, however, fewer than 16 digits are generally needed for any call number. At least one byte is therefore available as a check word to be used for verification purposes as described in detail hereinafter.

The bits of each code word emitted by unit $G_1$ may be generated by frequency-shift keying (FSK) with two voice-band frequencies respectively representing logical values "0" and "1". One or more voice-band frequencies may also constitute the trigger signal sent out by request generator $RQ_2$ which may have a structure as shown in FIG. 2. Thus, generator $RQ_2$ may comprise a monoflop or one-shot pulse generator M tripped by an enabling signal on a lead 2 to generate a brief pulse, e.g. of a duration upward of a few milliseconds, which reverses a switch I1 normally interconnecting line sections $1A_2$ and $1B_2$ so that section $1A_2$ is connected instead to an output of an oscillator O1 emitting a trigger pulse of a voice frequency $f_1$ upon being activated by the same monoflop pulse.

If, fortuitously, identification unit $G_1$ should respond to a frequency component in the transmitted speech band equal or close to trigger frequency $f_1$, the resulting interruption of conversation for a small fraction of a second will normally not be objectionable. The probability of such an undesired triggering of unit $G_1$ may, however, be reduced by making that unit responsive to a predetermined combination of frequencies from respective oscillators in lieu of the single frequency $f_1$ indicated in FIG. 2.

If the request generator $RQ_2$ is to be activated automatically by a control pulse from the exchange, e.g. in a traffic-monitoring system as described hereinafter with reference to FIG. 12, that control pulse will replace the manually generated enabling signal on lead 2.

As illustrated in FIG. 3, identification unit $G_1$ comprises an input transformer TD1 which galvanically decouples that unit from line section $1C_1$ while supplying it with voice frequencies including the trigger signal traveling on the subscriber's line loop. The incoming signals traverse an amplifier AM1 followed by a bandpass filter BP1 tuned to frequency $f_1$ (or by several such filters in parallel passing respective frequency components of the trigger signal). A rectifier RD1 converts the received trigger signal into a unipolar voltage giving rise to a flat-topped pulse if its magnitude exceeds a predetermined threshold of a squarer TR1.

The output signal of squarer TR1 is fed via a line 3 to a digital integrator IN1 stepped by clock pulses CK1 from a nonillustrated time base. This integrator works into a start/stop logic network SS1 receiving clock pulses CK2 from the time base. Network SS1, which detects the beginning and the end of a trigger signal, controls via an output lead 4 a switch I2 similar to switch I1 (FIG. 2) which, in the presence of that trigger signal, disconnects line section $1C_1$ from line section $1D_1$ and connects it instead to an extension 5 originating at a modulator MD1. A data store ME1, comprising a read-only memory as described hereinafter with reference to FIG. 4, is addressed by logic network SS1 in response to the incoming trigger signal to read out the bits of a characteristic code, in the rhythm of clock pulses CK2, to the concurrently activated modulator MD1 for transcoding into an FSK signal sent back by way of line section $1C_1$ to the inquiring subscriber station. The trigger signal may last for 100 ms.

As seen in FIG. 4, which showed details of components IN1, SS1, ME1 and MD1, integrator IN1 comprises a 3-stage shift register SH1 with a loading input connected to lead 3 and with a stepping input receiving the clock pulses CK1; the cycle length of these clock pulses is a minor fraction of the duration of the incoming trigger signal as modified by the preceding components, e.g. between one-fifth and one-tenth of that duration. The three stages of register SH1 are connected to respective inputs of an AND gate P1 and in parallel therewith to inputs of a NOR gate P2 whose outputs are respectively tied to a setting input (S) and a resetting input (R) of a set/reset flip-flop FF1. The set output (Q) of flip-flop FF1 is connected on the one hand to an input of an AND gate P3 in logic network SS1 and on the other hand to a loading input of another 3-stage shift register SH2 in that network which is stepped by clock pulses CK2. The cycle length of these clock pulses, which determines the bit period of the identification code to be read out, is a submultiple of that of clock pulses CK1 and may be about 3 to 4 ms. The three stage outputs of register SH2 are connected to respective inputs of an OR gate P4 whose output is the lead 4 extending to switch I2 (FIG. 3); an AND gate P6 has one input connected through an inverter P5 to the first of these stage outputs and has another input directly connected to the second one, a third input of gate P6 receiving the clock pulses CK2. Another flip-flop FF2 has a setting input (S) connected to the output of AND gate P6 and has its set output (Q) joined to a fourth input of OR gate P4; the same flip-flop output is further connected in parallel to enabling inputs (E) of two pulse counters CN1, CN2 forming part of data store ME1, to respective inputs of a pair of AND gates P7 and P8 in that data store, and to an enabling input (E) of an analog multiplexer MXA in modulator MD1. The two counters have clearing inputs (CL) connected in parallel to the output of AND gate P3. The resetting input (R) of flip-flop FF2 is connected to the output of an AND gate P9 having one input connected to the set output (Q) of a further flip-flop FF3 of logic network SS1, its other input receiving the clock pulses CK2. The reset output ($\overline{Q}$) of flip-flop FF2 is connected to the second input of AND gate P3 and in parallel therewith to an input of an AND gate P10 whose other input receives the inverted clock pulses $\overline{CK2}$; AND gate P10 works into a resetting input (R) of flip-flop FF3 whose setting input (S) is tied to a carry-out terminal (CO) of counter CN2 which is energized when that element has reached its final count.

Counter CN1, whose stepping input receives the inverted clock pulses $\overline{CK2}$, is provided with three stages and has its carry-out terminal (CO) tied to the stepping input of counter CN2 which is of the 4-stage type. Thus, counter CN2 is advanced after every eighth clock pulse to emit the addresses of 16 code words or bytes of 8 bits each which are stored in a read-only memory ROM1. The three stage outputs of counter CN1 are connected to respective inputs of a NOR gate P12 working into the second input of AND gate P7 whose output is joined to a reading input (Re) of that memory; connected in parallel with this reading input are an input of an AND gate P11 and a switching input of a multiplexer MX1 which forms part of modulator MD1. Gates P8 and P11, whose second inputs receive the inverted clock pulse $\overline{CK2}$, respectively work into a load-enable input (L) and a stepping input (CK) of an output register RE1 whose stages are joined to respective outputs of memory ROM1 to receive in parallel the significant bits of a byte stored in a cell of that memory addressed by counter CN2. For reasons that will become apparent hereinafter, this register needs to have only six stages of which only the last five need to be connected to respective memory outputs in order to receive information bits Nos. 1 through 5, to the exclusion of start bit No. 0 and stop bits Nos. 6 and 7. Register RE1 is serially read out into one data input of multiplexer MX1 whose other data input is permanently connected to a point of fixed potential (+) representing the logical value "1". The output of multiplexer MX1 terminates at the switching input of multiplexer MXA whose data inputs are connected to respective oscillators O2 and O3 generating keying frequencies $f_2$ and $f_3$; the output of multiplexer MXA is the two-wire line extension 5 leading to switch I2 (FIG. 3).

It should be noted that the several shift registers and pulse counters are advanced on the trailing edges of the pulses applied to their stepping inputs; the carry-out signal of a counter, however, coincides with its final stepping pulse.

Figure 5:
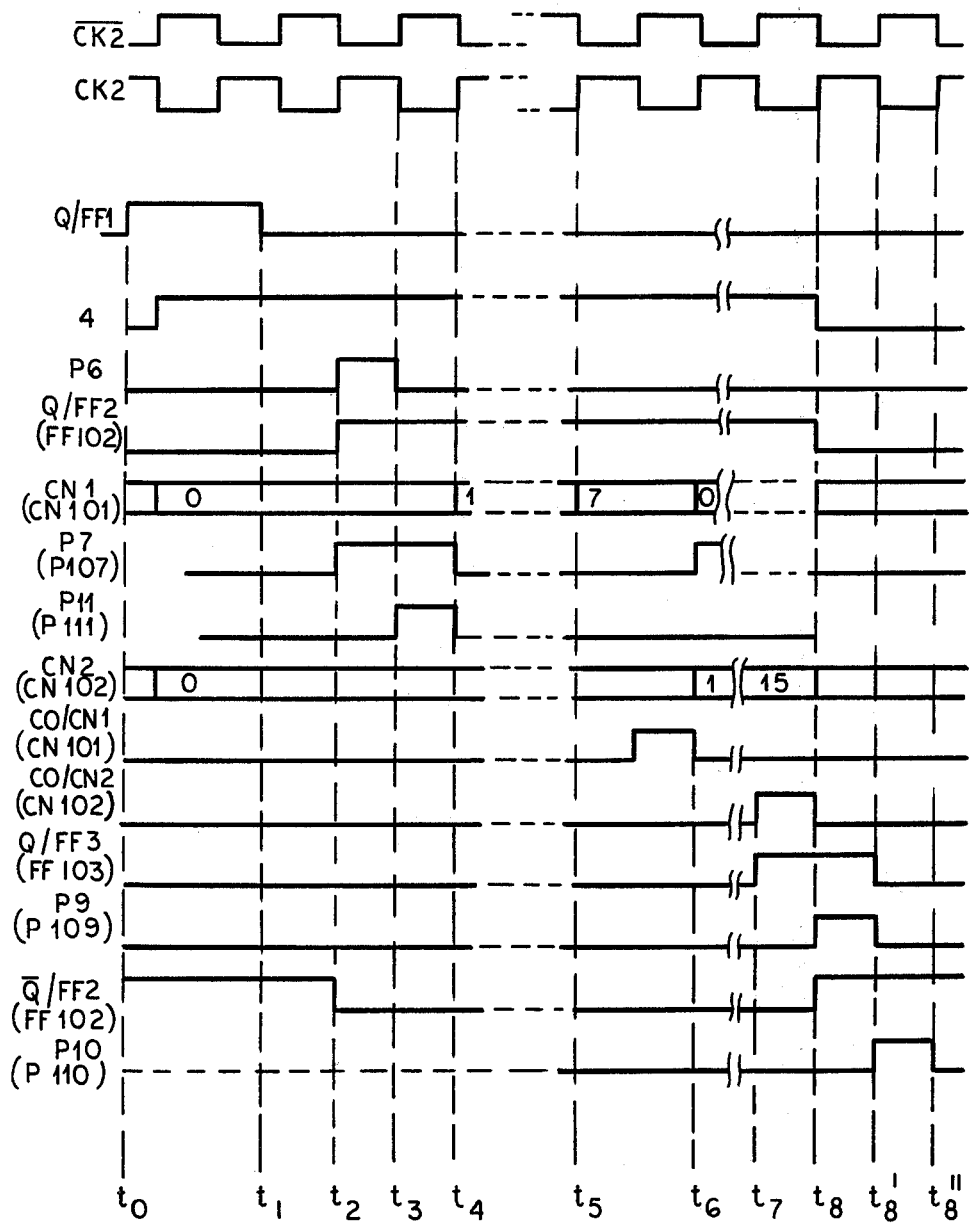
FIG. 5 is a set of graphs relating to the operation of the components shown in FIG. 4.

I shall now describe, with reference to FIG. 5, the operation of the identification unit $G_1$ shown in FIGS. 3 and 4.

The several graphs of FIG. 5 are labeled with the reference characters of the circuit elements to which they pertain. Thus, the first two graphs show the inverted and noninverted clock pulses $\overline{CK2}$ and CK2, respectively; the third graph represents the pulse emitted by flip-flop FF1 on its set output (Q) while the fourth graph shows the state of energization of lead 4 and the fifth graph gives the output pulse of gate P6. Each of the remaining eleven graphs is provided with two labels, the one in parentheses referring to a modified identification transmitter described hereinafter with reference to FIGS. 16–18.

When the arrival of a trigger signal causes the appearance of a high voltage level on the output lead 3 of squarer TR1 (FIG. 3), shift register SH1 is fully loaded at the end of three consecutive cycles of the fast clock pulses CK1 which have not been represented in FIG. 5. This results in the conduction of AND gate P1 and the cutoff of NOR gate P2 whereby flip-flop FF1 of integrator IN1 is set and energizes its output (Q) as shown in the third graph of FIG. 5. A resetting of that flip-flop does not take place until lead 3 has been de-energized for three consecutive clock cycles so that NOR gate P2 becomes again conductive. It will therefore be apparent that integrator IN1 prevents the setting of flip-flop FF1 by a transient pulse on lead 3 and also prevents its resetting by a brief interruption of an incoming trigger signal.

With the assumptions previously made, a cycle of clock pulses CK2 lasts for approximately the duration of the pulse shown in graph Q/FF1, i.e. from an instant $t_0$ to an instant $t_1$. With flip-flop FF2 reset, that pulse passes the gate P3 to clear the two counters CN1 and CN2. On the next trailing edge of a clock pulse CK2, the first stage of shift register SH2 is loaded whereby OR gate P4 conducts and energizes the lead 4 to reverse the switch I2 of FIG. 3. Even though the output pulse of flip-flop FF1 terminates before the end of the second clock cycle CK2, its progress through the three stages of register SH2 keeps the lead 4 energized until the trailing edge of the second inverted pulse $\overline{CK2}$ clears the first register stage at an instant $t_2$ so that AND gate P6 conducts in the presence of the next pulse CK2 and sets the flip-flop FF2 whose set output (Q) maintains the voltage on lead 4 via OR gate P4 even after the clearing of the third register stage. Since counter CN1 has been reset to zero, NOR gate P12 conducts so that AND gate P7 is also rendered conductive at instant $t_2$ even as the reset output ($\overline{Q}$) of flip flop FF2 is de-energized to cut off the AND gate P3.

Gate P11, turned on jointly with gate P8 by the leading edge of a pulse $\overline{CK2}$ at an instant $t_3$, enables the loading of output register RE1 with the contents of cell No. 0 of memory ROM1 which is addressed by the all-zero stage outputs of counter CN2 while an output signal of gate P7 appears on its reading input (Re). The trailing edge of this pulse $\overline{CK2}$, occurring at an instant $t_4$, initiates the serial discharge of the bits of the first code word from shift register RE1 into the lower data input of multiplexer MX1; it should be noted, however, that in the interval $t_2$–$t_4$ the multiplexer was switched by the output pulse of gate P7 to its upper data input so that the output of register RE1 was cut off while a logical "1" was fed as a start bit (No. 0) to the switching input of multiplexer MXA, with resulting transmission of keying frequency $f_2$ over line extension 5. Beginning with instant $t_4$, bits Nos. 1–7 are successively read out through multiplexer MX1 during respective clock cycles CK2; the last two of these bits are invariably of logical value "0", causing the emission of keying frequency $f_3$, since register RE1 is empty at that time. The readout of the last bit occurs at an instant $t_5$ and is followed by the stepping of counter CN2 and the resetting of counter CN1 to its zero position whereby NOR gate P12 again conducts and the aforedescribed steps are repeated with the readout of the second byte, i.e. the contents of memory cell No. 1, whose invariable start bit is emitted during a clock cycle beginning at an instant $t_6$ concurrently with the termination of the carry-out pulse of counter CN1. Instant $t_7$ marks the start of a corresponding carry-out pulse of counter CN2 which has reached its final position addressing memory cell No. 15. This causes the setting of flip-flop FF3 with resulting resetting of flip-flop FF2 by the output of gate P9 on the leading edge of the next clock pulse CK2 (instant $t_8$). The conduction of OR gate P4 ceases at that point, with resulting de-energization of lead 4, while the reappearance of voltage on the reset output ($\overline{Q}$) of flip-flop FF2 renders gate P10 conductive on the next pulse $\overline{CK2}$ to reset the flip-flop FF3 at an instant $t_8'$ whereby gate P9 is also cut off. Instant $t_8''$ marks the end of conduction of gate P10 whereupon unit $G_1$ is restored to its quiescent state.

Figure 6:
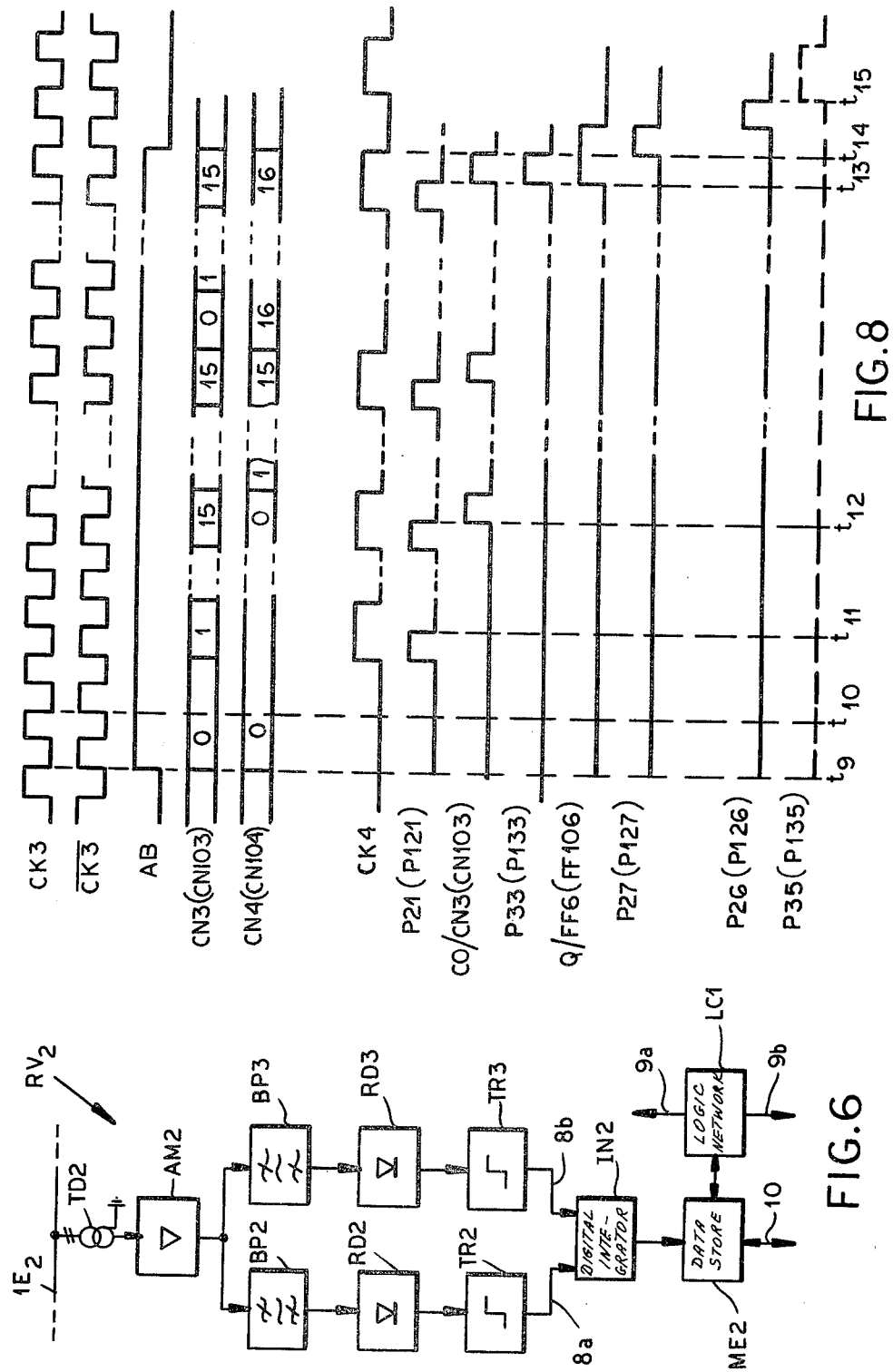
FIG. 6 is a block diagram of a code receiver forming part of the system of FIG. 1.

FIG. 6 shows details of code receiver $RV_2$ whose input is coupled to line section $1E_2$ by a transformer TD2 working into an amplifier AM2. The output circuit of this amplifier is split into two parallel branches including respective band-pass filters BP2, BP3 tuned to frequencies $f_2$, $f_3$, rectifiers RD2, RD3, and threshold circuits or squarers TR2, TR3. Output leads 8a and 8b of squarers TR2 and TR3 end at respective inputs of a digital integrator IN2 feeding a data store ME2. A logic network LC1 linked with this data store serves to verify the correctness of a received identification code and energizes either a no-fault output 9a or an error output 9b, depending on the result on its analysis. Data store ME2 is connected by a two-way bus 10 to a device for the registration and/or visualization of the received code, e.g. the display indicator $MV_2$ of FIG. 1.

Figure 7:
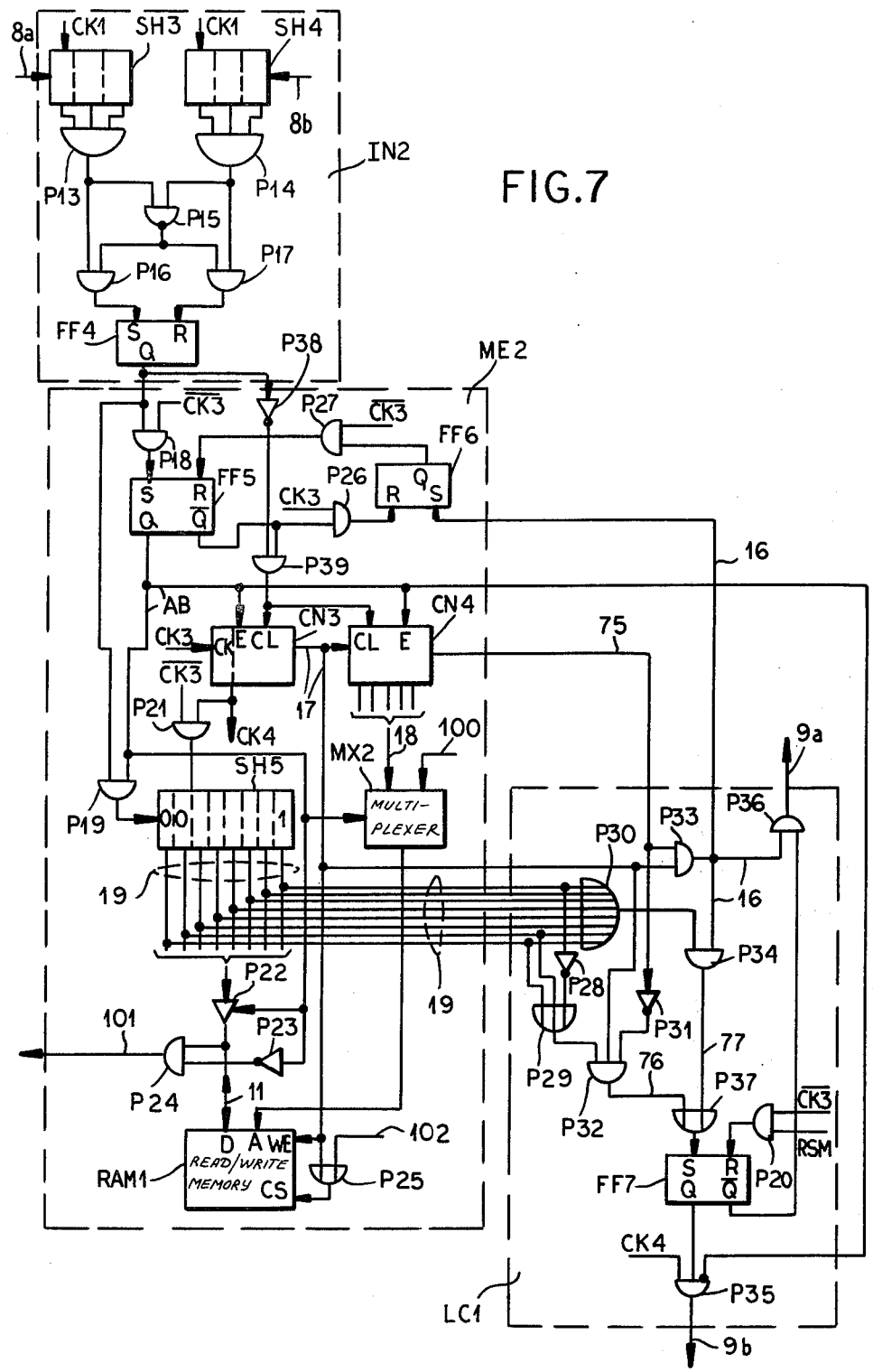
FIG. 7 is a more detailed circuit diagram of certain components of the code receiver shown in FIG. 6.

Reference will now be made to FIG. 7 for a more detailed description of receiver components IN2, ME2 and LC1. Integrator IN2 comprises two shift registers SH3, SH4 of three stages each, similar to register SH1 of FIG. 4, which are loadable by voltage pulses from squarers TR2 and TR3 (FIG. 6) via their respective output leads 8a and 8b. Registers SH3 and SH4 are stepped by clock pulses which have the same cadence as pulses CK1 fed to register SH1 (FIG. 4) and have therefore been correspondingly designated even though they are not produced by the same time base. Since no long-term synchronization between units $G_1$ and $RV_2$ is required, their two time bases may not have to operate at exactly the same pulse rate though synchronization by conventional means could be provided if necessary. The stage outputs of registers SH3 and SH4 are connected to three inputs of respective AND gates P13 and P14 with outputs tied to inputs of a common NAND gate P15. An AND gate P16, working into a setting input (S) of a flip-flop FF4, has inputs connected to the outputs of gates P13 and P15; analogously, an AND gate P17 working into the resetting input (R) of flip-flop FF4 has inputs connected to the outputs of gates P14 and P15.

The set output (Q) of flip-flop FF4 is connected in parallel to inputs of two further AND gates P18 and P19 forming part of data store ME2. Gate P18 has its second input connected to a source of clock pulses CK3 whose cycle length is half that of pulses CK2; the output of gate P18 is tied to the setting input (S) of a further flip-flop FF5 whose set output (Q) is connected on the one hand to the second input of gate P19 and on the other hand to respective enabling inputs (E) of a 4-stage pulse counter CN3 and a 5-stage pulse counter CN4. The reset output ($\overline{Q}$) of flip-flop FF5 is connected in parallel to respective inputs of two AND gates P26 and P39; the second input of gate P26 receives the clock pulses CK3 whereas the second input of gate P39 is connected through an inverter P38 to the output of flip-flop FF4. Gate P39, when conducting, clears the counters CN3 and CN4 which are cascaded in a manner analogous to that of counters CN1 and CN2 in FIG. 4; the stepping input (CK) of counter CN3 receives the clock pulses CK3 while that of counter CN4 is connected to the carry-out terminal of counter CN3 by a lead 17. The first stage of counter CN3 acts as a binary frequency halver so as to generate clock pulses CK4 of practically the same duration as recurrence rate as pulses CK2 generated by the time base of unit $G_1$. These pulses CK4 are fed to one input of an AND gate P21 whose other input receives the inverted pulses $\overline{CK3}$ and which steps an 8-stage shift register SH5 whose loading input is connected to the output of gate P19. AND gate P26, whose second input also receives the clock pulses CK3, works into a resetting input (R) of a flip-flop FF6 whose set output (Q) is tied to an input of an AND gate P27 which on another input receives the inverted pulses $\overline{CL3}$. Gate P27 has its output connected to the resetting input (R) of flip-flops FF5; thus, circuit P26, FF6, P27 looped around this flip-flop is analogous to circuit P10, FF3, P9 looped aroung flip-flop FF2 of FIG. 4. The setting input (S) of flip-flop FF6 is connected to a lead 16 which originates at the output of an AND gate P33 having inputs tied to lead 17 and to a lead 75 originating at the carry-out terminal of counter CN4. Lead 16 is also connected to inputs of two further AND gates P34 and P36 included in logic network LC1, the output of the latter gate being the "no-fault" lead 9a.

Network LC1 further comprises an OR gate P30 with eight inputs connected to respective leads of a multiple 19 extending from the stages of shift register SH5. The leads of multiple 19 are also connected to corresponding conductors of an output connection 101, forming part of bus 10 of FIG. 6, via respective drivers and AND gates which for simplicity's sake have been represented in FIG. 7 by a single amplifier P22 and a single gate P24. A two-way extension 11 of this multiple lies between drivers P22 and data terminals (D) of a read/write or random-access memory RAM1 which has address inputs (A) connected to an output multiple of a multiplexer MX2 with a first set of inputs 18 tied to the stage outputs of counter CN4. A second set of inputs of this multiplexer are joined to leads 100 of bus 10 originating at a nonillustrated address counter which may be manually activated by the user when it is desired to read out the contents of memory RAM1 to the associated indicator $MV_2$ (FIG. 1). Multiplexer MX2 is switchable by an enabling signal AB present on the set output (Q) of flip-flop FF5; this signal also reaches an activating input of amplifier P22 and, through an inverter P23, another input of gate P24. Lead 17 is further connected to a write-enable input (WE) and, through an OR gate P25, a control input (CS) of memory RAM1. OR gate P25 has another input connected to a lead 102 of bus 10 which is energized, concurrently with the activation of the address counter working into multiple 100, by a further counter in cascade therewith; a pair of such counters, forming part of reading-control circuitry for a similar memory, have been shown at CN101 and CN102 in FIG. 18 described hereinafter.

The first, seventh and eighth leads of multiple 19 are connected in network LC1 to respective inputs of an OR gate P29, with interposition of an inverter P28 in the case of the first lead. Gate P29 works into one input of an AND gate P32 having a second input tied to lead 17 and having a third input connected via an inverter P31 to the carry-out lead 75 of counter CN4. An output lead 76 of the gate P32 is joined to one input of an OR gate P37 which has another input tied to an output lead 77 of AND gate P34 whose second input is connected to the output of gate P30. The output of gate P37 is connected to a setting input (S) of a flip-flop FF7 whose resetting input (R) is joined to the output of an AND gate P20 which on one input receives the inverted signal $\overline{CK3}$ and can be supplied on another input with a resetting signal RSM manually generated by the subscriber at the associated station in the event of an irregularity. The set output (Q) of flip-flop FF7 is connected to an input of an AND gate P35 which on another input receives the clock pulses CK4 from counter CN3 and has a further, inverting input tied to the set output (Q) flip-flop FF5 carrying the enabling signal AB. The output of gate P35 is the "error" lead 9b; the reset output ($\overline{Q}$) of flip-flop FF7 is connected to a second input of gate P36. Leads 9a and 9b may serve to energize respective indicator lamps not shown.

The operation of the receiver $RV_2$ of FIGS. 6 and 7 will now be described with reference to FIG. 8 whose first two graphs show pulse trains CK3 and $\overline{CK3}$ while its third graph represents the enabling signal AB appearing on the set output (Q) of flip-flop FF5 and on a corresponding output of a similar flip-flop 105 shown in FIG. 17. With the exception of the sixth graph, which shows the clock pulses CK4, the remaining graphs again have labels in parentheses referring to the circuitry of FIGS. 16–18.

When transformer TD2 of FIG. 6 picks up the keying frequency $f_2$ or $f_3$ on line section 1E, that frequency traverses the corresponding output branch of amplifier AM2 to produce a predetermined voltage level on lead 8a of 8b entering the integrator IN2. Shift register SH3 or SH4 (FIG. 7) is thus loaded and, after three clock cycles CK1, causes the associated AND gate P13 or P14 to conduct. If only one of these two gates is conductive, as will be the case with normal code transmission, the corresponding gate P16 or P17 will be enabled to set or to reset the flip-flop FF4; as the start bit of any incoming byte is supposed to have the logical value "1", corresponding to the emission of keying frequency $f_2$, the arrival of such a byte will energize the set output (Q) of flip-flop FF4 so that flip-flop FF5 is also set via gate P18 by the first inverted pulse $\overline{CK3}$ to produce the enabling signal AB at an instant $t_9$.

Signal AB switches the multiplexer MX2 to multiple 18 so that counter CN4 can address the memory RAM1. With gate P19 conductive the first bit of byte No. 0 appears at the input of shift register SH5 and is loaded into that register even as counter CN3 is advanced by one step at an instant $t_{10}$, i.e. on the trailing edge of the next clock pulse CK3. At the end of the next clock cycle, and every two clock cycles thereafter, counter CN3 emits a clock pulse CK4 which allows the shift register SH5 to be stepped at an instant $t_{11}$, on the trailing edge of the corresponding pulse $\overline{CK3}$, by way of gate P21.

The appearance of the carry-out pulse of counter CN3 on lead 17, at an instant $t_{12}$ following the loading of the eighth bit of byte No. 0 into register SH5, energizes the write-enabling and control inputs (WE, CS) of memory RAM1 whereby the contents of that register are entered in the No. 0 cell of the memory as counter CN4 is still in its zero position. With one input of gate P32 already energized via inverter P31, this gate will remain cut off only if the start bit No. 9 is of logical value "1" and the stop bits Nos. 7 and 8 are of logical value "0" as evidence of the correct reception of the byte by the register. Otherwise, gates P32 and P37 will conduct to set the flip-flop FF7 which, however, will be without immediate effect.

The stepping of counter CN4 on the trailing edge of the carry-out pulse of lead 17 changes the address fed via multiplexer MX2 to inputs A of memory RAM1 whereupon register SH5 is loaded with the bits of the next byte in the aforedescribed manner. The procedure is repeated until all 16 bytes have been written in the memory; there follows a 17th loading cycle in which an all-0 bit combination is entered in register SH5. After the counter CN3 has taken its 15th step, the recurrence of the carry-out pulse of counter CN3 on lead 17 at an instant $t_{13}$ gives rise to a like pulse on the corresponding lead 75 but does not alter the contents of memory RAM1 since the bit combination then carried on the stage outputs of counter CN4 does not correspond to any cell address of that memory. The coincidence of the two carry-out pulses energizes the lead 16 by way of gate P33 so that gate P34 conducts if, on account of an irregularity, one or more leads of multiple 19 connected to OR gate P30 happen to be at a high voltage level; this would set the flip-flop FF7 if it was not previously set by an earlier error. In any event, the voltage on lead 16 sets the flip-flop FF6 while the gate P36 is unblocked to emit a "no-fault" signal on lead $9a$ if flip-flop FF7 has not been set.

With the appearance of the next inverted pulse $\overline{CK3}$ at an instant $t_{14}$, gate P27 is rendered conductive and resets the flip-flop FF5 so that signal AB is terminated. The following clock pulse CK3 then passes the gate P26 to reset the flip-flop FF6. The next clock pulse CK4, emitted by counter CN3 at an instant $t_{15}$, causes the appearance of an alarm signal on error lead $9b$ if flip-flop FF7 is set; this signal recurs periodically with every such clock pulse until the user resets the flip-flop FF7 by connecting lead RSM to a voltage source whereby gate P20 conducts on the next inverted pulse $\overline{CK3}$.

When an error-free identification code has been written in memory RAM1, possibly after a retriggering of unit G1 by another activation of request generator RQ2, that code can be extracted by the energization of lead 102 with concurrent operation of the address counter connected to multiple 100 which is now switched through to memory inputs A since the absence of enabling signal AB has placed the multiplexer MX2 in its alternate position. Gate P24, which was blocked by inverter P23 during the preceding writing operation, now enables the readout of the contents of the 16 memory cells via connection 101 to indicator MV2 (FIG. 1) as the reading command on lead 102 reaches its control input (CS) but not its writeenabling input (WE).

Figures 9, 11:
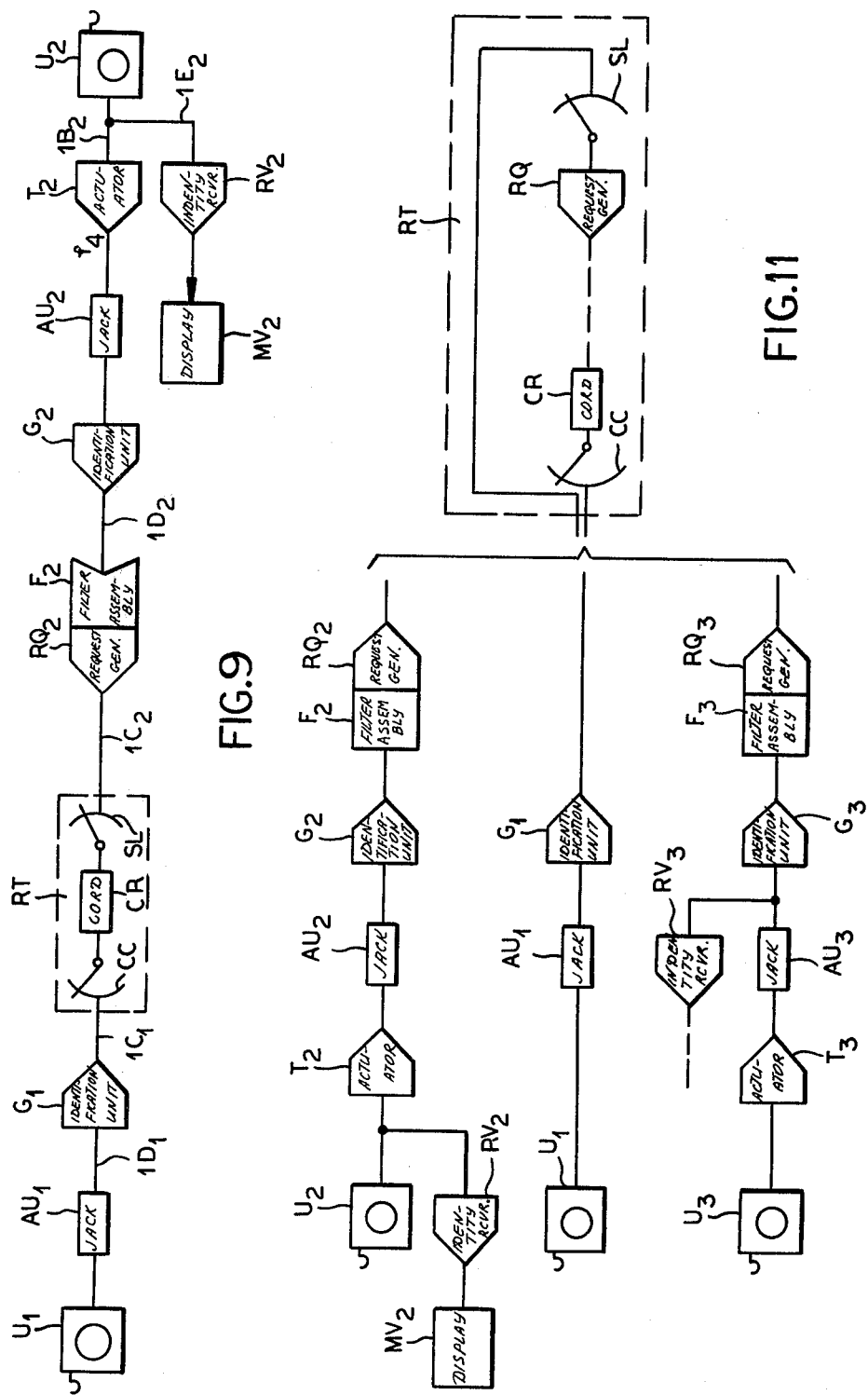
FIG. 9 is a block diagram similar to that of FIG. 1, illustrating additional elements included in the system.
FIG. 11 is another block diagram similar to those of FIGS. 1 and 9, showing a more elaborate system.

FIG. 9 shows the components of FIG. 1 supplemented by an identification unit G2 identical with unit G1 but associated with subscribed station U2. For simplicity's sake it is still assumed that only the latter station is provided with a request generator RQ2 and an identity receiver RV2. If the request generator were disposed at or close to station U2 for direct manipulation by the subscriber, as in the system of FIG. 1, its output signal would trigger both identification units. The position between line sections 1A2 and 1B2 is therefore now occupied by an actuator T2 while request generator RQ2 has been moved to a location beyond jack AU2 between line sections 1C2 and 1D2, i.e. downstream of the associated identification unit G2 (as seen from station U2) which lies between jack AU2 and line section 1D2. Activator T2, when operated through a pushbutton or the like by the subscriber at station U2, emits a signal of a frequency $f_4$ which lies above the voice band and has no effect upon unit G2 since it is not passed by the filter BP1 of FIG. 3. A filter assembly F2 interposed between identification unit G2 and request generator RQ2 directs the activating signal $f_4$ to that request generator but blocks any further progress of the signal down the line. This assembly, as shown in FIG. 10, comprises a low-pass filter LP1 in series with line section 1D2 and a band-pass filter BP4 in a branch thereof; filter LP1 passes the voice frequencies but stops the signal frequency $f_4$ while filter BP4 is tuned to the latter frequency and transmits it to a rectifier RD4 which in response thereto energizes the lead 2 terminating at the monoflop M of FIG. 2

FIG. 11 shows, by way further illustration, three subscriber stations U1, U2, U3 linked to one another through exchange RT. The lines extending from stations U1 and U2 to the exchange include the same components as in FIG. 9, namely jacks AU1 and AU2, identification units G1 and G2, request generator RQ2, filter assembly F2, actuator T2, identity receiver RV2 and visualizer MV2. Station U3 is also provided with an actuator T3 ahead of its jack AU3 and with an identification unit G3, a filter circuit F3 and a request generator RQ3 beyond that jack; in this instance, however, it is assumed that an associated identity receiver RV3 is not accessible to the subscriber but is disposed at a location remote from the station, e.g. at the exchange, with its input connected to the line at a point between jack AU3 and unit G3. A visualizer or recorder serving to register the code detected by receiver RV3 has not been illustrated.

Also shown in FIG. 11 is a request generator RQ, inserted in series with cord circuit CR between line finder CC and final selector SL, which can be automatically activated by a signal passing through that selector—upon the establishment of a talking connection—to trigger the identification unit of the calling station for the purpose of recording its characteristic code with the aid of another identity receiver and registration device which have not been illustrated. The presence of this generator RQ does not interfere with the triggering of the same calling-station identifier by a request signal from the called station.

FIG. 12 shows part of a telephone exchange equipped with a traffic monitor MT controlling, via respective leads 2' and 2", two request generators RQ' and RQ" inserted back to back between a group selector SG and a line selector SL. An identification unit G, triggerable by request generator RQ', lies between selector SG and an incoming trunk GE assumed to originate at a communication network not equipped with similar units assigned to individual subscriber stations. An identity receiver RV, coupled to the line section interconnecting the two request generators, reports to traffic monitor MT the characteristic code of truck GE, as emitted by unit G upon activation of generator RQ', as well as that of a called station downstream of selector SL, as emitted by that station's identification unit upon activation of generator RQ".

In an analogous manner, such a unit G could also send out the characteristic code of a switchboard or PBX connected thereto upon being triggered by a request signal from the exchange or from a called station.

In FIG. 13 I have shown a system generally similar to that of FIG. 11, except that the exchange RT has been replaced by an exchange RTX whose switching circuits including line finder CC, group selector SG and final selector SL are controlled by a processor ES on the basis of routing information stored in a memory thereof, that information including the identities of both the calling and the called station participating in a talking connection. The individual identification units $G_1$, $G_2$, $G_3$ of FIG. 11 have been replaced by two oppositely facing centralized code transmitters GI' and GI" in the exchange itself, communicating with processor ES by way of respective two-way buses 6' and 6"; transmitter GI' is disposed between two cord sectiona 1F and 1G just downstream of line finder CC while transmitter GI" lies just upstream of selector SL. Furthermore, slightly modified filter assemblies $FX_2$ and $FX_3$ have been substituted for circuits $F_2$ and $F_3$ of FIG. 11. As illustrated in FIG. 14 for a generic assembly FX, these modified filtering units differ from that of FIG. 10 merely by the provision of a threshold circuit TR4 inserted between the output lead 2 of rectifier BP4 and a lead 7 extending to processor ES for informing same of seizure of that assembly by a subscriber-generated activation signal; this is to prevent the operation of the code transmitter GI' or GI" proximal to the requesting station in response to that activation signal.

FIG. 15 illustrates a modification of the system of FIG. 13 in which centralized request generators RQ', RQ" with filter circuits F', F" have been substituted for the outlying request generators $RQ_2$, $RQ_3$ assigned to respective subscriber stations. Request generator RQ' responds to an activation signal from component $T_1$ associated with subscriber station $U_1$, or from a similar activator of any other calling station, reaching its filter circuit F' through line finder CC and code transmitter GI' which again remains unaffected by that signal; the request signal emitted by generator RQ' in response thereto triggers the downstream code transmitter GI" into sending out the identification of the called station reached through line selector SL. Analogously, the called subscriber may activate request generator RQ" to elicit from code transmitter GI' the identity of the calling station accessed by line finder CC. Since in this instance the subscriber-activated request generator lies downstream of the associated code transmitter, filter circuits F' and F" can be of the type shown in FIG. 10.

The provision of centralized request generators in conformity with FIG. 15 will usually be warranted only when a certain minimum proportion of all subscriber stations served by the exchange (e.g. 10%) are equipped with activators therefor.

The centralized code transmitter GI' illustrated in FIG. 16, which of course is also representative of its mate GI", has components TD3, AM3, BP5, RD5, TR5 and IN3 equivalent to components TD1, AM1, BP1, RD1, TR1 and IN1 of identification unit $G_1$ shown in FIG. 3. Transformer TD3 inductively couples the amplifier AM3 to cord section 1G which is normally connected to upstream section 1F via a switch I3 similar to switch I2 of FIG. 3. Integrator IN3 has an output lead 12 (corresponding to the set output of flip-flop FF1 in FIG. 4) extending in parallel to two logic networks LU, LC2. Network LU, upon recognizing the validity of an incoming request signal, reports that request to the processor over a lead 60 forming part of bidirectional bus 6' (FIG. 13 or 15) that also includes a lead 61 terminating at a data store ME3 which comprises a read-write or random-access memory RAM2, shown in FIGS. 17 and 18, receiving from the processor the characteristic code of the calling station (or of the called station in the case of code transmitter GI"). Logic network LC2, whose task is similar to that of network LC1 forming part of the identity receiver described with reference to FIGS. 6 and 7, feeds possible error signals via a lead 14 to network LU which in response thereto can retrigger the processor into sending the requested characteristic code to data store ME3; an input of this data store is also connected to lead 60 for enablement to receive the re-emitted code. Various output connections extending from data store ME3 to logic network LC2 are symbolized in FIG. 16 by a line 13.

An output multiple 15 of data store ME3, extending to a modulator MD2 similar to component MD1, includes a lead 150 which serves to reverse the switch I3 to connect cord section 1G to an output lead 50 of this modulator, analogous to lead 5 of FIG. 3, while the code written in data store ME3 is being read out. Lead 150 also extends to logic network LU for inhibiting another triggering of the processor by an incoming request during such readout.

Details of components LU, LC2 and ME3 will now be described with reference to FIGS. 17 and 18, the latter Figure showing some details of data store ME3 omitted in FIG. 17.

Data store ME3 comprises, as part of the writing-control circuitry for its memory RAM2, an AND gate P40 with inputs connected to lead 61, to a set output (Q) of a flip-flop FF8 and to a lead from the processor's time base carrying inverted clock pulses $\overline{CK3}$ (cf. FIG. 8). Gate P40 has an output connected to a setting input (S) or a flip-flop FF105 and, a parallel therewith, to clearing inputs (CL) of two cascaded pulse counters CN103, CN104 which are similar to counters CN3, CN4 of FIG. 7. Thus, counter CN103 generates a clock pulse CK4 for every two clock pulses CK3 fed to its stepping input for advancing a shift register SH105 via an AND gate p121 which, like gate P21 of FIG. 7, receives inverted pulses $\overline{CK3}$ on its second input. An enabling signal AB, appearing on the step output (Q) of flip-flop FF105, is again fed to a switching input of a multiplexer MX102 having a set of inputs connected to the stage outputs of counter CN104 through a multiple 118; signal AB also goes to enabling inputs (E) of counters CN103, CN104 as well as to a loading input of register SH105 by way of an AND gate P119 when this gate is unblocked by an input signal on lead 61. The carry-out terminal (CO) of counter CN103 is connected by a lead 117, corresponding to lead 17 of FIG. 7, to the stepping input of counter CN104, to an input of an AND gate P133 whose other input is tied to the carry-out lead 175 of counter CN104, and to write-enable and control inputs (WE, CS) of memory RAM2 between which an OR gate P125 is inserted.

A loop circuit including AND gates 126 and P127 connects the resetting input (R) and the reset output ($\overline{Q}$) of flip-flop FF105 to the set output (Q) and the resetting input (R) of a flip-flop FF106, in a manner corresponding to that of flip-flops FF5 and FF6 in FIG. 7, with gates P126 and P127 respectively unblocked by pulses CK3 and $\overline{CK3}$. Flip-flop FF106 has its setting input (S) tied to the output lead 116 of gate P133 which is also joined to respective inputs of gates P134 and P136. Gate P134 has its second input connected to the stage outputs of shift register SH105 through an 8-lead multiple 119 and an OR gate P130; as before, the first, seventh and eighth leads of this multiple are connected to respective inputs of an OR gate P129, with interposition of an inverter P128 in the case of the lead carrying the start bit of a code word; gate P 129 works into one input of an AND gate P132 having a second input tied to lead 117 and having a third input connected through an inverter P131 to lead 175. Output leads 176 and 177 of gates P132 and P134 are connected to inputs of an OR gate P137 working into a setting input (S) of a flip-flop FF107 whose set output (Q) is tied to one input of an AND gate P135 receiving clock pulses CK4 from counter CN103 on another input thereof; a third, inverting input of gate P135 is joined to the set output (Q) of flip-flop FF105 carrying the enabling signal AB. The reset output ($\overline{Q}$) of flip-flop FF107 is connected to the second input of gate P136 which is provided with an output lead 115.

The eight stage outputs of register SH105 are further connected, again in a manner similar to that described with reference to FIG. 7, to a set of drivers represented by a single amplifier P122 working via a two-way multiple 111 into the data terminals (D) of memory RAM2 and in parallel therewith into respective AND gates, symbolized by a single gate P124, which in the presence of enabling signal AB is blocked through an inverter P123 connected to the set output of flip-flop FF105. Gates P124 and P125 respectively have an output multiple 201 and an input lead 202 more fully described hereinafter with reference to FIG. 18.

The output of gate P135 is connected to the setting input (S) of a further flip-flop FF9 which is resettable by inverted pulses $\overline{CK4}$ and whose set output is tied to respective inputs of two AND gates P120 and P42. Gate P120, working into the resetting input (R) of flip-flop FF107, receives on its second input the inverted pulses $\overline{CK3}$; thus, the function of gate P120 is analogous to that of gate P20 in FIG. 7, except that the output signal of flip-flop FF9 replaces the manually generated resetting signal RSM. A counter CN5 in network LC2, which may be of the modulo-3 type so as to have a counting capacity of 3, has its stepping input connected to lead 116 and its clearing input (CL) joined to the output lead 12 of integrator IN3 (FIG. 16) which also extends to an input of an AND gate P43 in output network LU; the carry-out terminal of counter CN5 is connected via an inverter P41 to the second input of AND gate P42 whose output is the lead 14 shown in FIG. 16. Gate P43 has a second input connected to lead 150 through an inverter P44; the outputs of gates P42 and P43 are connected via an OR gate P45 to lead 60 which triggers the processor ES (FIG. 13) into emitting the requested code on lead 61.

Figure 17:
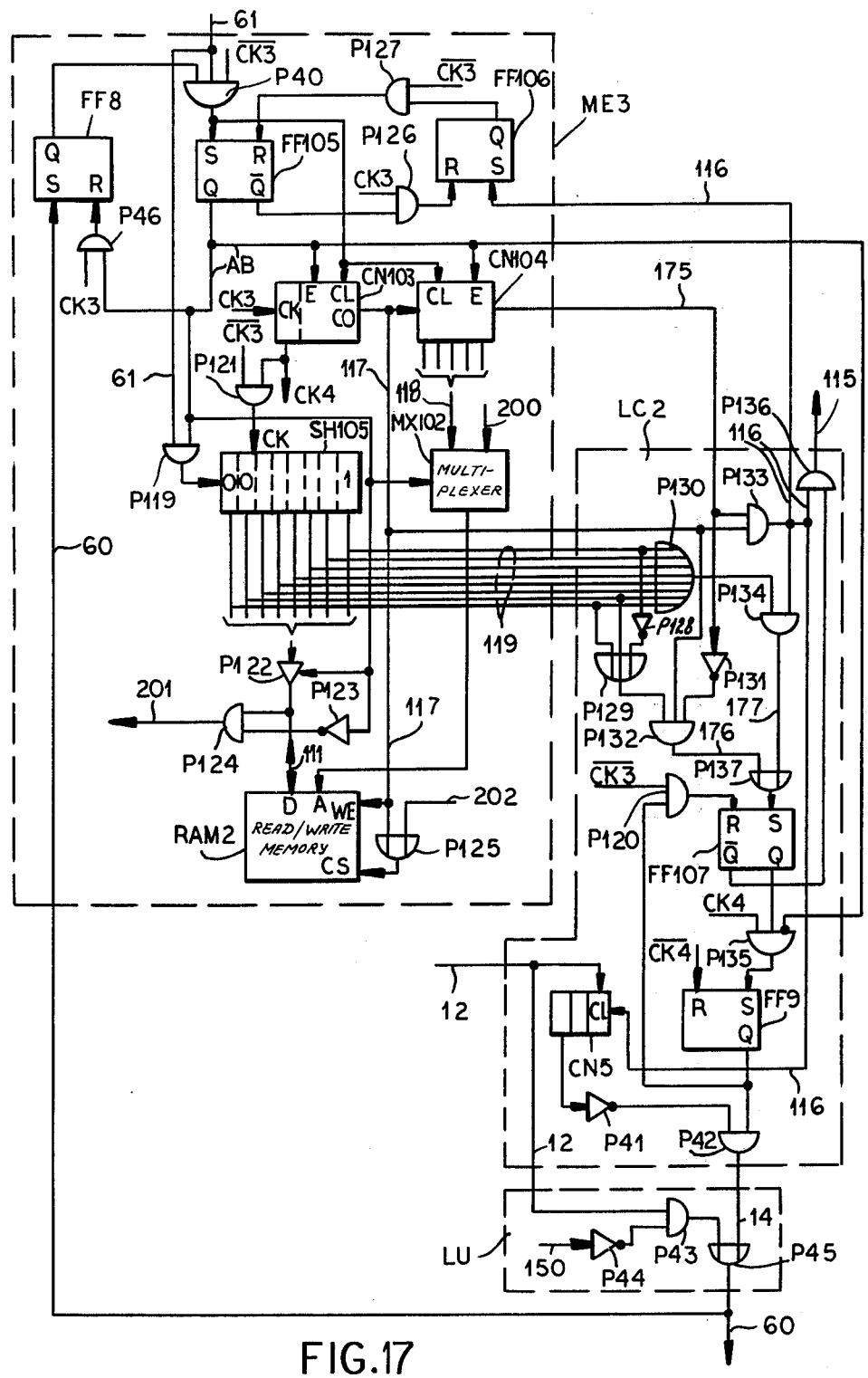
FIG. 17 is a more detailed circuit diagram of certain components of the code transmitter illustrated in FIG. 16.
Figure 18:
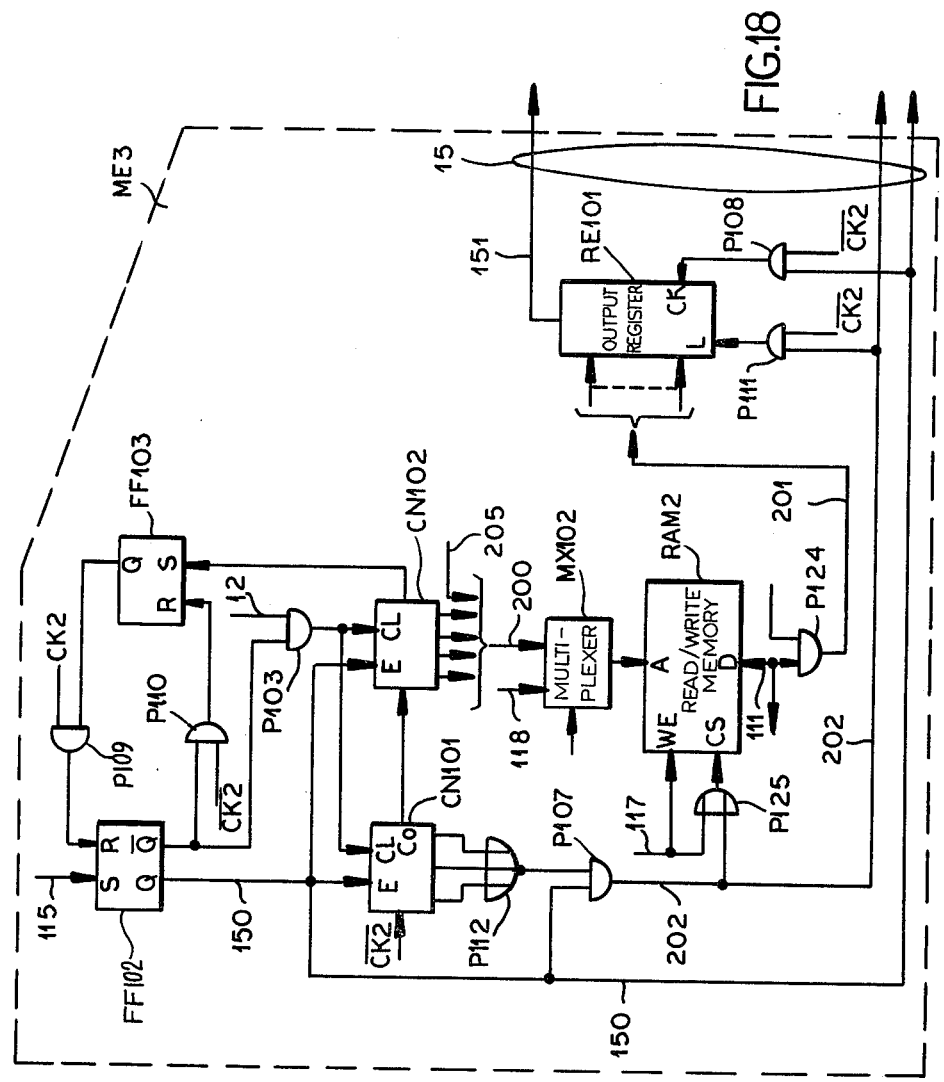
FIG. 18 is a more detailed circuit diagram of part of the same code transmitter, showing additional elements thereof.

The output lead 115 of gate P136, energized when a characteristic code has been correctly written in memory RAM2, terminates at a setting input (S) of a flip-flop FF102 which forms part of the reading-control circuitry of memory RAM2, shown in FIG. 18, and is connected to a companion flip-flop FF103 in a resetting loop including AND gates P109 and P110 respectively receiving clock pulses CK2 and their inversions $\overline{CK2}$ on their other inputs, all as described with reference to flip-flops FF2, FF3 shown in FIG. 4. The set output (Q) of flip-flop FF102 is tied by way of lead 150 to enabling inputs (E) of two cascaded counters CN101 and CN102, similar to those designated CN1 and CN2 in FIG. 4, whose clearing inputs (CL) are joined to the output of an AND gate P103 with inputs respectively connected to the reset output ($\overline{Q}$) of flip-flop FF102 and to lead 12. The three stage outputs of counter CN101 are tied to respective inputs of a NOR gate P112 working into one input of an AND gate P107 whose other input is joined to lead 150; the output lead of gate P107 is the conductor 202 which, besides driving the control input CS of memory RAM2 through OR gate P125 as also shown in FIG. 17, is connected to one input of an AND gate P111 and is part of the multiple 15 extending to modulator MD2 of FIG. 16.

The stage outputs of counter CN102 are connected to four leads of a multiple 200 terminating at a second set of inputs of multiplexer MX102 whose outputs are joined to the five address inputs (A) of memory FAM2; a fifth lead 205 of this multiple is connected to a point of fixed potential (e.g. ground) since the memory has only 16 cells and since no additional counting cycle is required during a reading phase when the multiplexer is switched to leads 200 by the absence of enabling signal AB.

The output multiple 201 of gate group P124 extends to the stage inputs of a shift register RE101 with a load-enable input (L) and a stepping input (CK) tied to respective outputs of gate P111 and of another AND gate P108 having one input joined to lead 150; the other inputs of gates P108 and P111 receive inverted pulses $\overline{CK2}$ for loading the register in parallel and unloading it in series, via a lead 151 also forming part of multiple 15, in a manner similar to that described with reference to output register RE1 of FIG. 4. As will be apparent from that description, register RE101 also needs to have only six stages of which again only the last five need to be loaded from memory RAM2. This memory, just like memory RAM1 of FIG. 4, need therefore not store more than five bits in each cell and only five of the eight leads 119 will have to be extended to multiples 111 and 201.

The operation of the code tranmsitter shown in FIGS. 16-18 ought to be readily apparent from the foregoing description, along with that of FIGS. 5 and 8 in which reference is to be made to the parenthetical labelings of the several graphs. Thus, a request pulse appearing on lead 12 in the reset state of flip-flop FF102 passes the gates P43 and P45 to energize the lead 60, thereby setting the flip-flop FF8. Upon the termination of this pulse, the processor emits the start bit of the first byte of the requested code on lead 61 whereby flip-flop FF105 is set and counters CN103, CN104 are cleared on the leading edge of the first pulse $\overline{CK3}$ (instant t9) unblocking the AND gate P40. The resulting enabling signal AB opens the AND gate P119 for the passage of that bit to the loading input of shift register SH105; gate P46 conducts on the next clock pulse CK3 to reset the flip-flop FF8 whereby gate P40 is cut off to prevent any further resetting of the counters.

The following steps of writing the characteristic code in memory RAM2 and checking its correctness are the same as those described hereinabove with reference to FIG. 7. If no error is detected, gate P136 conducts at the end of these operations and energizes the lead 115 so as to set the flip-flop FF102. The memory RAM2 is then read in the manner described for memory RAM1 of FIG. 7.

If an irregularity occurs, flip-flop FF9 is set upon conduction of gate P135 (instant $t_{15}$) whereupon gate P42 energizes its output lead 14 as long as the ancillary counter CN5, which was reset by the request pulse on lead 12, has not reached its final position. The signal on lead 14 therefore retriggers the processor and again sets the flip-flop FF8 to unblock the gate P40, as before, to start a new writing cycle for memory RAM2. If there is again an error, the procedure can be repeated once more; the cutoff of gate P42 by the counter CN5 via inverter P41 will have no effect upon the energization of lead 115 if the third attempt is successful. Otherwise, no further retriggering of the processor will occur until a new request pulse on lead 12 clears the counter CN5.

As noted at the outset, the 16 bytes of a characteristic code need not all represent digits of a station-identifying number but may include a check word whose information bits complement analogous bits of the remaining bytes to a sum of predetermined nature, i.e. odd or even, for a parity test. Such a test can be performed by the circuitry of FIG. 19 in which the second through sixth leads of multiple 19 of FIG. 7 are connected to respective single-stage or modulo-2 counters collectively designated CN6; no carry is being transferred between any of these binary counters. Their outputs are tied to respective inputs of a coincidence circuit P48 which is in the form of an OR gate, as shown, if the check sums of all five bit positions are to be even; if they were expected to be odd, a NAND gate would be used instead. Gate P48 works into one input of an AND gate P49 whose other input is connected to lead 16 of FIG. 7. The output of gate P49 is tied to one input of an OR gate P47 which replaces the gate P37 of FIG. 7 and has two other inputs respectively connected to leads 76 and 77; the output of gate P47 is connected to the setting input (S) of flip-flop FF7 which is therefore also set if, at the end of the writing phase, one or more counters CN6 have output signals which do not satisfy the parity test.

Figure 19:
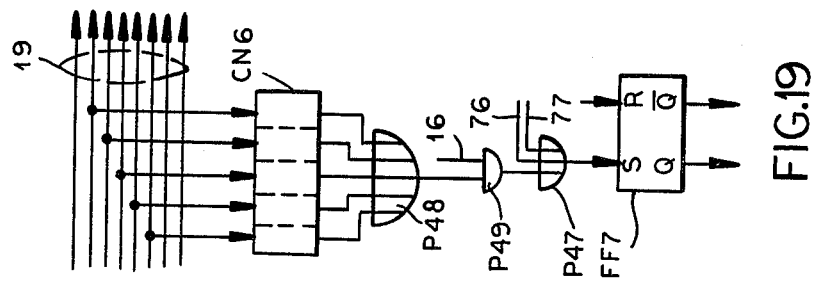
FIG. 19 is a fragmentary circuit diagram showing a partial modification of the structure of FIG. 7.

Obviously, the arrangement of FIG. 19 can also be used in the logic network LC2 of FIG. 17, with substitution of flip-flop FF107 for element FF7 and replacement of leads 16, 19, 76 and 77 by leads 116, 119, 176 and 177.

Figure 20:
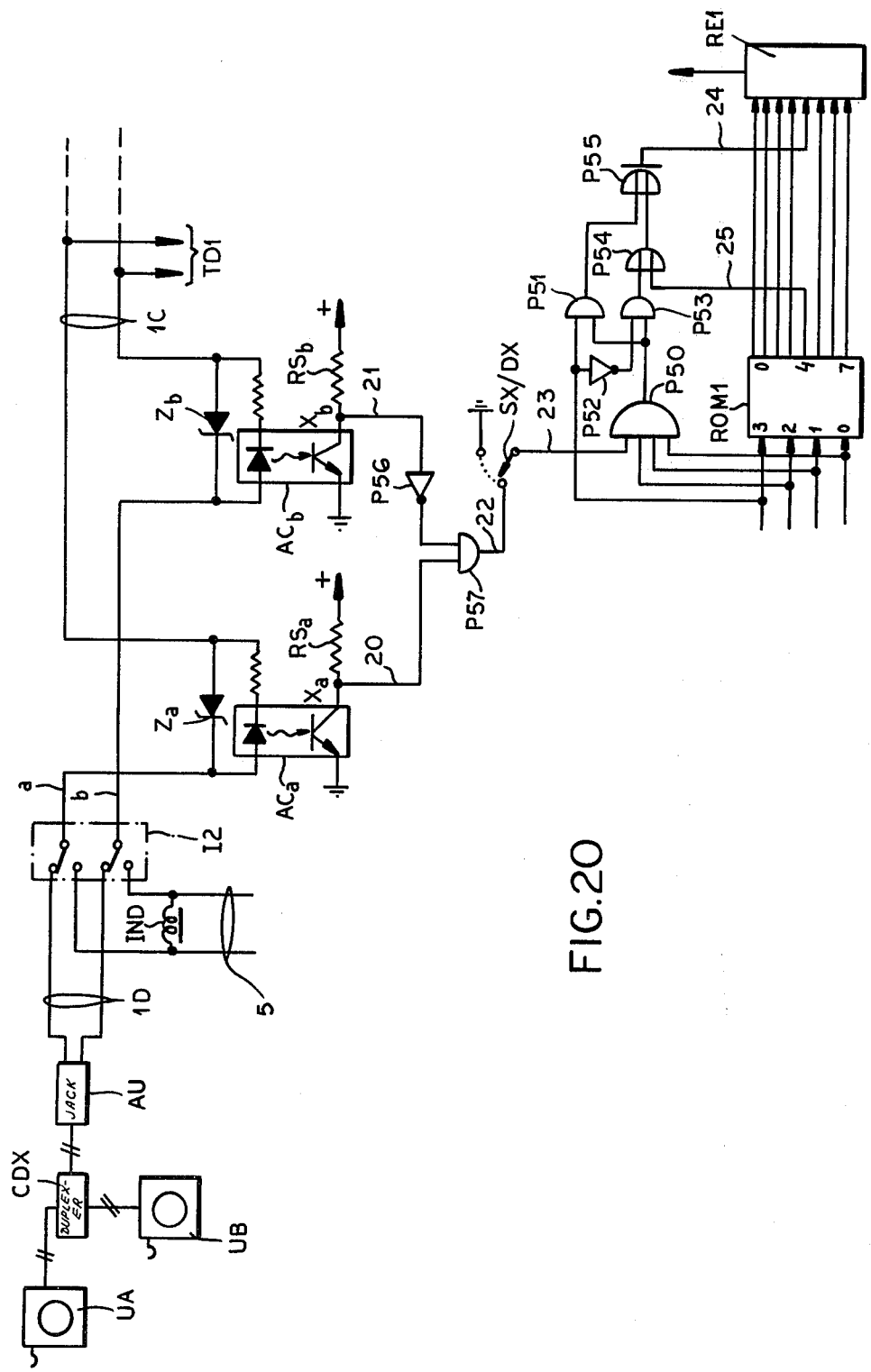
FIG. 20 is a fragmentary circuit diagram showing part of a system according to my invention with two subscriber stations sharing a common local line.

FIG. 20 shows the application of my invention to a system with an exchange unassisted by a processor in which two subscriber stations UA, UB share a party line whose characteristic code is stored in memory ROM1 of the associated identification unit shown in FIGS. 3 and 4. These stations are coupled in the usual manner to respective conductors of their line loop through a duplexer or privacy box CDX which prevents either party from seizing the line when the other is talking or from listening in on the other party's conversation. These conductors are extended through a jack AU to respective wires of a line section 1D which are normally connected by the contacts of switch I2 to respective conductors a and b of an adjoining line section 1C connected across the primary of transformer TD1. In the alternate position of switch I2 these conductors are connected to the wires of line extension 5 which are bridged by an inductance IND serving to close the loop independently of the output impedance of modulator MD1 (FIG. 3) during emission of the characteristic code, thereby providing a seizure-maintaining path for direct current.

Two photoelectric couplers $AC_a$ and $AC_b$, each comprising a light-emitting diode juxtaposed with a phototransistor, are respectively inserted in line conductors a and b. Collector terminals $X_a$ and $X_b$ of couplers $AC_a$ and $AC_b$ are connected by way of respective resistors $RS_a$, $RS_b$ to a source of positive voltage so that their potential is high in the absence of current flow through the corresponding LED; each coupler is further shunted by a protective diode $Z_a$, $Z_b$. The direct line current traversing the coil IND and the LEDs, whose polarity depends on which subscriber has seized the line, causes conduction of one or the other phototransistor.

An AND gate P57 has one input connected to terminal $X_a$ by a lead 20 and to terminal $X_b$ by a lead 21 including an inverter P56. Gate P57 will therefore conduct only when coupler $AC_b$ is traversed by a direct loop current to the exclusion of coupler $AC_a$, i.e. when the subscriber of station UB is connected, in which case an input of an AND gate P50 will be energized via two leads 22, 23 interconnected by a manually operable simplex/duplex switch SX/DX; the latter can be placed in its alternate position, grounding the lead 23, when the local line here considered serves only one subscriber station. Gate P50 has three other inputs connected in parallel with address inputs Nos. 0, 1 and 2 of memory ROM1 to the first three stage outputs of the associated counter CN2 (FIG. 4) which are energized for the readout of the eight bytes when that counter generates address 0111. The fourth stage output, tied to address input No. 3, is connected to an input of an AND gate P51 and via an inverter P52 to an input of another AND gate P53; gate P51 and P53 have second inputs connected in parallel to the output of gate P50. The eight data terminals No. 0 through No. 7 of memory ROM1 are connected, as in FIG. 4, to respective stage inputs of output register RE1 except that the connection between the No. 4 terminal and the corresponding register input includes two leads 24, 25 between which an OR gate P54 and an Exclusive-OR gate P55 are cascaded. Gate P55 has another input tied to the output of gate P54 whereas gate P51 works into another input of EX-OR gate P55.

As long as line a, b is idle, or when it is seized by station UA, AND gates P50, P51, P53 and P57 will be cut off so that the fifth bit of any byte will pass unaltered from the No. 4 data terminal to the corresponding register input as with the circuit arrangement of FIG. 4. If, however, the subscriber of station UB is connected so that terminal $X_b$ is grounded by the phototransistor of coupler $AC_b$, voltage on leads 22 and 23 will cause gate P50 to conduct during the readout of the eighth and the sixteenth byte. For purposes of this description it will be assumed that the fifth bit of the eighth byte stored in memory ROM1 will have the logical value "0"; with gate P53 rendered conductive on the eighth byte, however, the bit reaching the fifth stage input of register RE1 by way of lead 24 will invariably have the logical value "1". Thus, the characteristic code unloaded from register RE1 with station UB connected to the line will differ by this particular bit from the code emitted when station UB is so connected or when the line serves a single subscriber station.

Since the 16$^{th}$ byte is assumed to be a check word, as described with reference to FIG. 19, its fifth bit must also be inverted upon intervention of gate P50 to preserve the correctness of the parity test. With gate P51 conducting during readout of this 16$^{th}$ byte, EX-OR gate P55 acts as an inverter for the bit then emitted by terminal No. 4 via lead 25 and gate P54 whereby the desired result is achieved.

The discriminating circuitry of FIG. 20 need not be provided, of course, in any identification unit associated with a line intended to serve only a single subscriber station.

The memories and many of the other constituents of the described identification units or code transmitters can be realized with integrated circuitry, except for input transformers TD1, TD3, switches I2, I3, inductance IND and possibly some filter and oscillator capacitors. Altogether, only a few hundred gates (close to 300) need to be integrated so that the circuitry can be implemented with MSI techniques. Similar considerations apply to the identity receivers which in many instances will be far fewer in number than the identification-transmitting units.

I claim:

1. In a telephone system wherein a multiplicity of subscriber stations are linked via signal paths including respective local lines to a common exchange having switching circuitry for establishing talking connections between calling and called stations, the combination therewith of:

request-generating means switchable into an established talking connection;

identity-transmitting means including memory means for storing a characteristic code assigned to a local line associated with a subscriber station participating in such talking connection, said identity-transmitting means being responsive to a trigger signal sent out over the established talking connection by said request-generating means for sending back the characteristic code stored in said memory means;

integrating means in said identity-transmitting means for initiating an emission of the contents of said memory means only upon continuous presence of said trigger signal for a predetermined minimum period; and identity-receiving means having access to an established talking connection for registering the characteristic code emitted by said identity-transmitting means in response to said trigger signal.

2. In a telephone system wherein a multiplicity of subscriber stations are linked via signal paths including respective local lines to a common exchange having switching circuitry for establishing talking connections between calling and called stations, the combination therewith of:

request-generating means switchable into an established talking connection;

a multiplicity of identification units each including memory means for storing a characteristic code assigned to a respective local line coupled thereto and associated with a subscriber station participating in such talking connection, each identification unit being responsive to a trigger signal sent out over the established talking connection by said request-generating means for sending back the characteristic code stored in said memory means; and identity-receiving means having access to an established talking connection for registering the characteristic code emitted by any of said identification units in response to said trigger signal, at least one of said local lines being a party line shared by two associated subscriber stations and forming a loop with two wires which are respectively energized upon seizure of said party line by one or the other of the associated subscriber stations, the characteristic code assigned to said party line consisting of a predetermined number of multibit words, the identification unit associated with said party line including discriminating means for inverting a predetermined bit of a particular word of the characteristic code stored in the memory means thereof in response to energization of one of said wires.

3. In a telephone system wherein a multiplicity of subscriber stations are linked via signal paths including respective local lines to a common exchange having switching circuitry for establishing talking connections between calling and called stations, the combination therewith of:

request-generating means switchable into an established talking connection;

identity-transmitting means including memory means for storing a characteristic code assigned to a local line associated with a subscriber station participating in such talking connection, said identity-transmitting means being responsive to a trigger signal sent out over the established talking connection by said request-generating means for sending back the characteristic code stored in said memory means, said identity-transmitting means further including a source of two signal frequencies switchable by the contents of said memory means for emitting said signal frequencies in binary combinations representative of a plurality of multibit words constituting said characteristic code; and identity-receiving means having access to an established talking connection for registering the characteristic code emitted by said identity-transmitting means in response to said trigger signal, said identity-receiving means having two parallel branches each including a band-pass filter tuned to a respective signal frequency, a timer-controlled shift register connected to said branches for storing successive bits derived from said signal frequencies, a read/write memory loadable in parallel with the bits of code words successively entered in said shift register, and indicator means for registering the contents of said read/write memory.

4. In a telephone system wherein a multiplicity of subscriber stations are linked via signal paths including respective local lines to a common exchange having switching circuitry controlled by a processor for establishing talking connections between calling and called stations, the combination therewith of:

request-generating means switchable into an established talking connection;

a centralized code transmitter including a read/write memory for storing a characteristic code assigned to a local line associated with a subscriber station participating in such talking connection, said read/write memory being loadable with data bits from said processor, identifying a participating station, in response to a trigger signal sent out over the established talking connection by said request-generating means for sending back the characteristic code stored in said read/write memory, said centralized code transmitter further including a timer-controlled shift register with a multiplicity of stages serially loadable by said processor with a plurality of multibit word constituting the characteristic code of a participating station, said read/- write memory having writing inputs respectively connected to said stages for receiving in parallel the bits of code words successively entered in said shift register, each code word including predetermined start and stop bits together with intervening information bits, and a logic network connected to the stages of said shift register carrying said start and stop bits for verifying the correctness of a code word entered therein; and identity-receiving means having access to an established talking connection for registering the characteristic code emitted by said centralized code transmitter in response to said trigger signal.

5. In a telephone system wherein a multiplicity of subscriber stations are linked via signal paths including respective local lines to a common exchange having switching circuitry for establishing talking connections between calling and called stations, the combination therewith of:

a multiplicity of request generators accessible to respective stations for temporary insertion into an established talking connection to forward a trigger signal toward another station participating in said talking connection;

a multiplicity of identification units each including memory means for storing a characteristic code assigned to a respective local line coupled thereto and associated with a subscriber station participating in such talking connection, each identification unit being responsive to a trigger signal received over the established talking connection from a remote request generator for sending back the characteristic code stored in said memory means;

identity-receiving means having access to an established talking connection for registering the characteristic code emitted by any of said identification units in response to said trigger signal; and subscriber-controlled means at a station associated with a given local line for generating an activating signal inserting an accessible request generator into said talking connection downstream of the particular identification unit coupled to said given local line as viewed from the associated station, said activating signal having a frequency outside a voice band normally transmitted over said given local line, said accessible request generator including switchover means for temporarily disconnecting said particular identification unit from said talking connection during emission of said trigger signal.

6. The combination defined in claim 5 wherein said given local line includes a first filter between said respective station and said particular identification unit for blocking said activating signal and a second filter in a path bypassing said first filter and said particular identification unit for selectively transmitting said activating signal.

7. The combination defined in claim 1 or 3 wherein said identity-transmitting means comprises a multiplicity of identification units each coupled to a respective subscriber station through the associated local line, said memory means comprising a read-only memory in each identification unit.

8. The combination defined in claim 7 wherein said request-generating means comprises a multiplicity of individual request generators operable by subscriber-controlled means at respective called stations for temporary insertion into an established talking connection to forward said trigger signal to the identification unit associated with the calling station participating in said talking connection.

9. The combination defined in claim 8 wherein a local line serving a called station equipped with subscriber-controlled means for operating an individual generator is coupled to an associated identification unit containing a characteristic code assigned to said local line, said request generator being insertable into said talking connection downstream of the associated identification unit as viewed from said called station and being responsive to an activating signal generated by said subscriber-controlled means with a frequency outside a voice band normally transmitted over said local line, said request generator including switchover means for temporarily disconnecting the associated identification unit from said talking connection during emission of said trigger signal.

10. The combination defined in claim 9 wherein said local line includes a first filter between said called station and the associated identification unit for blocking said activating signal and a second filter in a path bypassing said first filter and said associated identification unit for selectively transmitting said activating signal.

11. The combination defined in claim 2 wherein one of the words of said characteristic code is a check word with bits complementing corresponding bits of the other words thereof for a parity test, said discriminating means comprising logical circuitry for accompanying an inversion of said predetermined bit by an inversion of the corresponding bit of said check word.

12. The combination defined in claim 11 wherein the memory means of the associated identification unit has address inputs energized in different combinations by a pulse counter during successive counting cycles for delivering the bits of each code word on a plurality of output leads during a respective counting cycle, said logical circuitry including an Exclusive-OR gate in one of said output leads and further gates in cascade with said Exclusive-OR gate having inputs connected to said pulse counter in parallel with said address inputs.

13. The combination defined in claim 1, wherein said identity-transmitting means comprises a source of two signal frequencies switchable by the contents of said memory means for emitting said signal frequencies in binary combinations representative of a plurality of multibit words constituting said characteristic code, said identity-receiving means having two parallel branches each including a band-pass filter tuned to a respective signal frequency, a timer-controlled shift register connected to said branches for storing successive bits derived from said signal frequencies, a read/write memory loadable in parallel with the bits of code words successively entered in said shift register, and indicator means for registering the contents of said read/write memory.

14. The combination defined in claim 13 or 3 wherein each code word includes predetermined start and stop bits together with intervening information bits, said identity-receiving means further comprising a logic network connected to stage outputs of said shift register carrying said start and stop bits for verifying the correctness of a code word entered therein.

15. The combination defined in claim 14 wherein said branches are connected to a loading input of said shift register by way of integrating circuitry generating a bit only upon continuous presence of the corresponding signal frequency for a predetermined minimum period.

16. The combination defined in claim 1 wherein said exchange is equipped with a processor intervening in the establishment of a talking connection between a calling and a called station, said identity-transmitting means comprising a centralized code transmitter including a read/write memory loadable in response to said trigger signal with data bits from said processor identifying a participating station.

17. The combination defined in claim 16 wherein said centralized code transmitter further includes a timer-controlled shift register with a multiplicity of stages serially loadable by said processor with a plurality of multibit words constituting the characteristic code of a participating station, said read/write memory having writing inputs respectively connected to said stages for receiving in parallel the bits of code words successively entered in said shift register, each code word including predetermined start and stop bits together with intervening information bits, said centralized code transmitter being provided with a logic network connected to the stages of said shift register carrying said start and stop bits for verifying the correctness of a code word entered therein.

18. The combination defined in claim 17 or 4 wherein said centralized code transmitter has a start circuit activable by said trigger signal to initiate the loading of said shift register with the bits of a characteristic code from said processor, said logic network having an error output connected to said start circuit for activating same to re-initiate the loading of said shift register with the bits of the same characteristic code upon detection of an irregularity in a code word previously received from said processor, said logic network further including a counter limiting the number of consecutive reloadings of said shift register with the bits of the same characteristic code.

19. The combination defined in claim 1, 16, 17, 2, 3 or 4 wherein said request-generating means comprises a centralized request generator at said exchange.

20. The combination defined in claim 1, 12, 13, 19, 4, 5 or 6 wherein said identity-receiving means comprises a centralized code receiver at said exchange.

21. The combination defined in claim 14 wherein one of the words of said characteristic code is a check word with bits complementing corresponding information bits of the other code words for a parity test, said logic network further including summing means connected to stage outputs of said shift register carrying said information bits for determining the odd or even character of the result of adding the sum of homologous information bits to the corresponding bit of said check word.

* * * * *

UNITED STATES PATENT AND TRADEMARK OFFICE
CERTIFICATE OF CORRECTION

PATENT NO. : 4,445,001

DATED : 24 April 1984

INVENTOR(S) : Ottavio BERTOGLIO

It is certified that error appears in the above-identified patent and that said Letters Patent is hereby corrected as shown below:

In the heading, left column, item [73], please change the assignee's name to read:

-- CSELT Centro Studi e Laboratori Telecomunicazioni SpA, Turin, Italy --.

Signed and Sealed this

Sixth Day of November 1984

[SEAL]

*Attest:*

GERALD J. MOSSINGHOFF

*Attesting Officer*  *Commissioner of Patents and Trademarks*